US012608921B2

(12) United States Patent  
Tai et al.

(10) Patent No.: US 12,608,921 B2  
(45) Date of Patent: Apr. 21, 2026

(54) TRAINING APPARATUS, CLASSIFICATION APPARATUS, TRAINING METHOD, CLASSIFICATION METHOD, AND PROGRAM

(71) Applicant: NEC Corporation, Tokyo (JP)

(72) Inventors: Tsenjung Tai, Tokyo (JP); Masato Toda, Tokyo (JP); Eiji Kaneko, Tokyo (JP); Kazutoshi Sagi, Tokyo (JP)

(73) Assignee: NEC Corporation, Tokyo (JP)

( * ) Notice: Subject to any disclaimer, the term of this patent is extended or adjusted under 35 U.S.C. 154(b) by 295 days.

(21) Appl. No.: 18/270,764

(22) PCT Filed: Dec. 3, 2021

(86) PCT No.: PCT/JP2021/044389  
§ 371 (c)(1),  
(2) Date: Jul. 3, 2023

(87) PCT Pub. No.: WO2022/153711  
PCT Pub. Date: Jul. 21, 2022

(65) Prior Publication Data  
US 2024/0062525 A1 Feb. 22, 2024

(30) Foreign Application Priority Data  
Jan. 12, 2021 (JP) ................................ 2021-003116

(51) Int. Cl.  
*G06V 10/774* (2022.01)  
*G06V 10/764* (2022.01)  
(Continued)

(52) U.S. Cl.  
CPC .......... *G06V 10/774* (2022.01); *G06V 10/764* (2022.01); *G06V 10/7715* (2022.01); *G06V 10/776* (2022.01); *G06V 10/82* (2022.01)

(58) Field of Classification Search  
CPC ............... G06V 10/774; G06V 10/764; G06V 10/7715; G06V 10/776; G06V 10/82;  
(Continued)

(56) References Cited

U.S. PATENT DOCUMENTS 10,956,817 B2 * 3/2021 Oliveira Pinheiro .. G06N 3/047  
11,170,581 B1 * 11/2021 Marek ................... G06V 10/774  
(Continued)

FOREIGN PATENT DOCUMENTS

JP 2010-048651 A 3/2010  
JP 2019-028876 A 2/2019  
(Continued)

OTHER PUBLICATIONS

Xiang Xu et al. , "d-SNE: Domain Adaptation using Stochastic Neighborhood Embedding," Jun. 2019, Proceedings of the IEEE/CVF Conference on Computer Vision and Pattern Recognition (CVPR), 2019, pp. 2497-2503.*  
(Continued)

*Primary Examiner* — Omar S Ismail  
(74) *Attorney, Agent, or Firm* — Sughrue Mion, PLLC

(57) ABSTRACT

To provide an efficient training process even in a case where training images having a limited variation of shooting angles are available.  
Solution to Problem  
A training apparatus (10) comprises: feature extraction section (11) for extracting source domain feature values from input source domain image data and for extracting target domain feature values from input target domain image data; angle conversion section (12) for generating converted source domain feature values by converting the source domain feature values as if the converted source domain feature values are extracted from source domain image data having different angles from the input source domain image  
(Continued)

data, and generating converted target domain feature values by converting the target domain feature values as if the converted target domain feature values are extracted from target domain image data having different angles from the input target domain image data; class prediction section(13) for predicting source domain class prediction values from the source domain feature values and the converted source domain feature values, and predicting target domain class prediction values from the target domain feature values and the converted target domain feature values; and updating section (14) for updating at least one of (i) the feature extraction section, (ii) the angle conversion section, and (iii) the class prediction section.

16 Claims, 18 Drawing Sheets

(51) Int. Cl.
    *G06V 10/77*          (2022.01)
    *G06V 10/776*      (2022.01)
    *G06V 10/82*        (2022.01)

(58) Field of Classification Search
    CPC .......... G06N 3/044; G06N 3/045; G06N 3/08;
                   G06T 2207/20081; G06T 2207/20084;
                                         G06T 7/00
    See application file for complete search history.

(56) References Cited

U.S. PATENT DOCUMENTS

| | | | |
|---|---|---|---|
| 2015/0324655 A1 | 11/2015 | Chalasani et al. | |
| 2019/0065903 A1 | 2/2019 | Wang et al. | |
| 2019/0354807 A1 * | 11/2019 | Tsai ........................ | G06N 3/084 |
| 2020/0089994 A1 | 3/2020 | Sato | |
| 2020/0118423 A1 * | 4/2020 | Moura ................. | G08G 1/0129 |
| 2020/0286229 A1 | 9/2020 | Ogino et al. | |
| 2021/0081721 A1 | 3/2021 | Sagi et al. | |
| 2021/0201152 A1 * | 7/2021 | Santillán Perez ........ | G06N 3/09 |
| 2021/0216818 A1 | 7/2021 | Umeda et al. | |
| 2021/0263143 A1 | 8/2021 | Kawato et al. | |
| 2021/0312674 A1 * | 10/2021 | Abrol ..................... | G06N 3/045 |
| 2022/0101101 A1 * | 3/2022 | Mathur ................. | G06N 3/047 |
| 2022/0126864 A1 * | 4/2022 | Moustafa .......... | B60W 60/0013 |

FOREIGN PATENT DOCUMENTS

| | | | | | |
|---|---|---|---|---|---|
| JP | 2019-207491 A | | 12/2019 | | |
| JP | 2020-003379 A | | 1/2020 | | |
| JP | 2020-046928 A | | 3/2020 | | |
| JP | 2020-144700 A | | 9/2020 | | |
| JP | 2020-532008 A | | 11/2020 | | |
| JP | WO2019/116494 A1 | | 11/2020 | | |
| KR | 102389368 B1 | * | 4/2022 | ........... | G06N 3/0481 |
| WO | WO-2019045982 A1 | * | 3/2019 | ............. | G06V 10/82 |

OTHER PUBLICATIONS

Huaqi Zhang et al.,"Cross-Boosted Multi-Target Domain Adaptation for Multi-Modality Histopathology Image Translation and Segmentation," Jul. 4, 2022, IEEE Journal of Biomedical and Health Informatics, vol. 26, No. 7, Jul. 2022, pp. 3197-3205.*
Zhengming Ding et al.,"Graph Adaptive Knowledge Transfer for Unsupervised Domain Adaptation," Sep. 2018, Proceedings of the European Conference on Computer Vision (ECCV), 2018, pp. 1-5.*
André Stuhlsatz et al., "Feature Extraction with Deep Neural Networks by a Generalized Discriminant Analysis," Mar. 6, 2012, IEEE Transactions on Neural Networks and Learning Systems, vol. 23, No. 4, Apr. 2012, pp. 596-603.*
JP Office Action for JP Application No. 2023-541366, mailed on Mar. 5, 2024 with English Translation.
Extended European Search Report for EP Application No. 21919600.3, dated on Apr. 25, 2024.
International Search Report for PCT Application No. PCT/JP2021/044389, mailed on Jan. 25, 2022.
English translation of Written opinion for PCT Application No. PCT/JP2021/044389, mailed on Jan. 25, 2022.
Xiang Xu et al., "d-SNE: Domain Adaptation using Stochastic Neighborhood Embedding", 2019 IEEE/CVP Conference on Computer Vision and Pattern Recognition (CVPR 2019).

* cited by examiner

START feature extraction    S21 class prediction    S23

END

FIG. 6
Example of Image Data $I^S$
(Source Domain)
Example of Image Data $I^T$
(Target Domain)
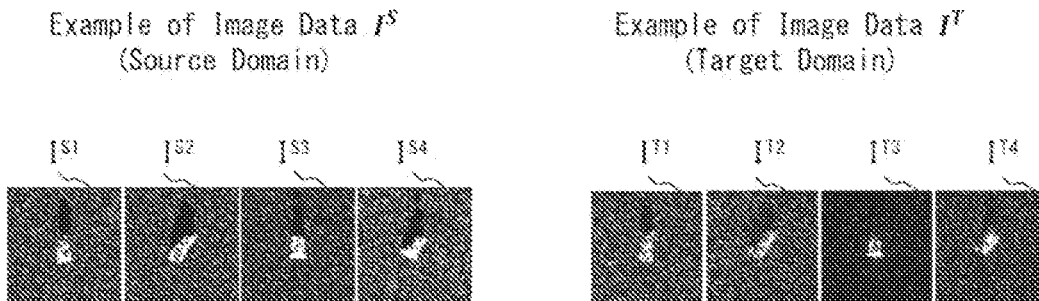
FIG. 7
Angle Conversion for Source Domain
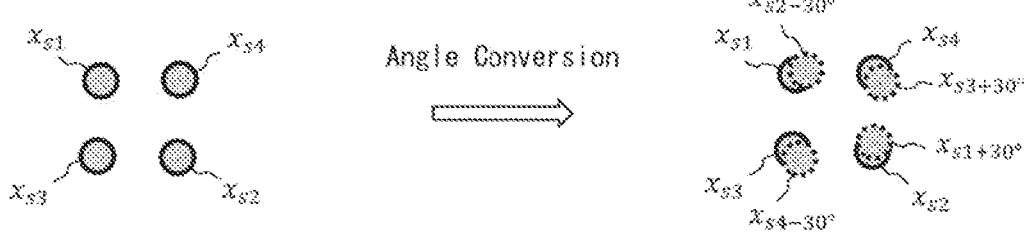
Angle Conversion for Target Domain
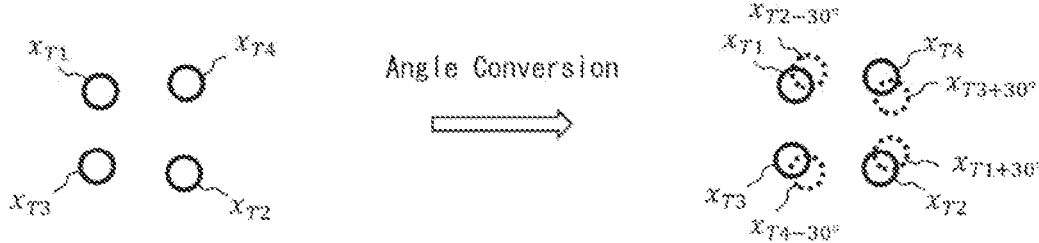

FIG. 8
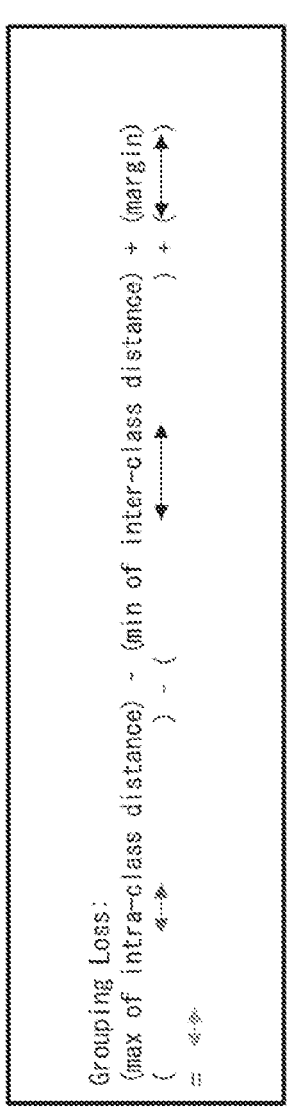
Grouping Loss:
(max of intra-class distance) - (min of inter-class distance) + (margin)
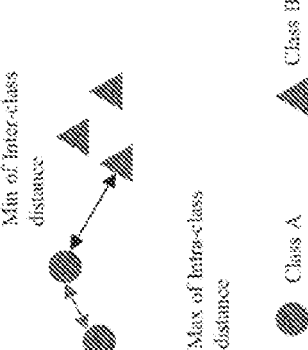
Min of inter-class distance
Max of intra-class distance
Class A
Class B

Figure 15:
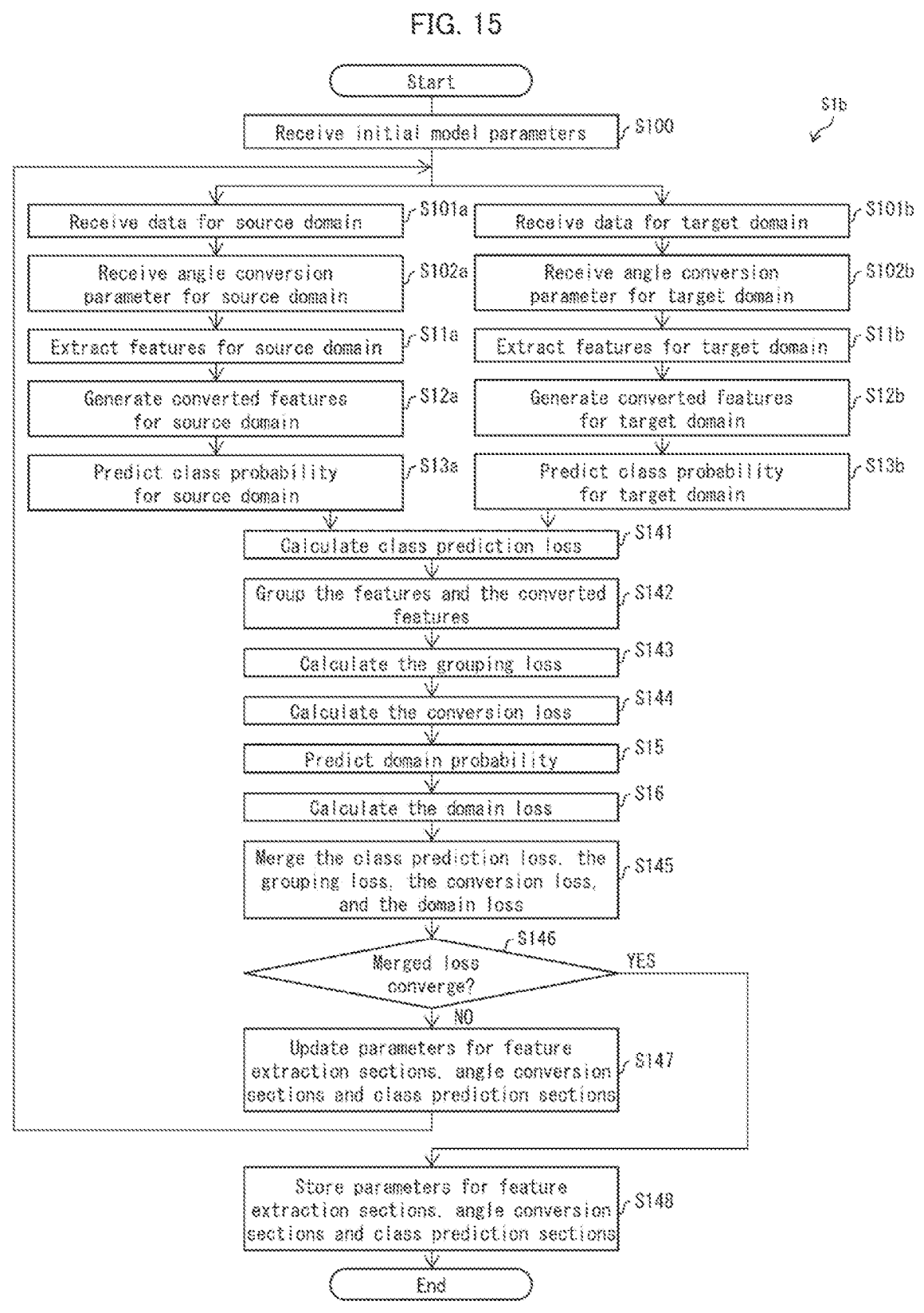

```
                          ┌──────────┐
                          │  Start   │
                          └────┬─────┘
                               ▼
              ┌────────────────────────────────┐
              │ Receive initial model parameters │ ─ S100
              └────────────────┬───────────────┘
                               │
        ┌──────────────────────┼──────────────────────┐
        ▼                                              ▼
┌──────────────────────┐ S101a     ┌──────────────────────┐ S101b
│Receive data for source domain│    │Receive data for target domain│
└──────────┬───────────┘           └──────────┬───────────┘
           ▼                                   ▼
┌──────────────────────┐ S102a     ┌──────────────────────┐ S102b
│  Receive angle conversion │       │  Receive angle conversion │
│  parameter for source domain│     │  parameter for target domain│
└──────────┬───────────┘           └──────────┬───────────┘
           ▼                                   ▼
┌──────────────────────┐ S11a      ┌──────────────────────┐ S11b
│Extract features for source domain│ │Extract features for target domain│
└──────────┬───────────┘           └──────────┬───────────┘
           ▼                                   ▼
┌──────────────────────┐ S12a      ┌──────────────────────┐ S12b
│  Generate converted features│     │  Generate converted features│
│    for source domain  │           │    for target domain  │
└──────────┬───────────┘           └──────────┬───────────┘
           ▼                                   ▼
┌──────────────────────┐ S13a      ┌──────────────────────┐ S13b
│  Predict class probability│       │  Predict class probability│
│    for source domain  │           │    for target domain  │
└──────────┬───────────┘           └──────────┬───────────┘
```

Calculate class prediction loss — S141

Group the features and the converted features — S142

Calculate the grouping loss — S143

Calculate the conversion loss — S144

Predict domain probability — S15

Calculate the domain loss — S16

Merge the class prediction loss, the grouping loss, the conversion loss, and the domain loss — S145

Merged loss converge? — S146    YES

NO

Update parameters for feature extraction sections, angle conversion sections and class prediction sections — S147

Store parameters for feature extraction sections, angle conversion sections and class prediction sections — S148

End

TRAINING APPARATUS, CLASSIFICATION APPARATUS, TRAINING METHOD, CLASSIFICATION METHOD, AND PROGRAM

This application is a National Stage Entry of PCT/JP2021/044389 filed on Dec. 3, 2021, which claims priority from Japanese Patent Application 2021-003116 filed on Jan. 12, 2021, the contents of all of which are incorporated herein by reference, in their entirety.

TECHNICAL FIELD

The present application relates to a training apparatus, a classification apparatus, a training method, a classification method, and a program.

BACKGROUND ART

Machine learning techniques such as neural networks often require a large amount of labeled data in order to train their parameters. On the other hand, it sometimes happens that only a small amount of labeled data is available.

So-called domain adaptation techniques have been proposed which may be applicable in such a situation (for example, see Non-patent Literature 1). The domain adaptation techniques exploit a large amount of alternative representative data set (often referred to as source domain data set) besides target data set (often referred to as target domain data set).

CITATION LIST

Non Patent Literature

NPL 1: Xiang Xu et. al., "d-SNE: Domain Adaptation using Stochastic Neighborhood Embedding", Proceedings of the IEEE conference on computer vision and pattern recognition. 2019

SUMMARY OF INVENTION

Technical Problem

The domain adaptation technique disclosed in Non-patent Literature 1 has a problem that it does not provide an efficient training process in a case where training images having a limited variation of shooting angles are available.

An example aspect of the present invention is attained in view of the problem, and an example object is to provide an efficient training process in a case where training images having a limited variation of shooting angles are available.

Solution to Problem

In order to attain the object described above, a training apparatus comprising at least one processor, the processor carrying out: extraction process for extracting, by one or more feature extractor, source domain feature values from input source domain image data and target domain feature values from input target domain image data; angle conversion process for generating, by one or more angle converters, converted source domain feature values by converting the source domain feature values as if the converted source domain feature values are extracted from source domain image data having different angles from the input source domain image data, and converted target domain feature values by converting the target domain feature values as if the converted target domain feature values are extracted from target domain image data having different angles from the input target domain image data; class prediction process for predicting, by one or more class predictors, source domain class prediction values from the source domain feature values and the converted source domain feature values, and target domain class prediction values from the target domain feature values and the converted target domain feature values; and updating process for updating at least one of (i) the one or more feature extraction process, (ii) the one or more angle converter, and (iii) the one or more class predictor with reference to a source domain classification loss computed with reference to the source domain class prediction values, a target domain classification loss computed with reference to the target domain class prediction values, a conversion loss computed with reference to the source domain feature values, the converted source domain feature values, the target domain feature values and the converted target domain feature values, and a grouping loss computed with reference to the source domain feature values, the converted source domain feature values, the target domain feature values, and the converted target domain feature values.

In order to attain the object described above, a classification apparatus comprising at least one processor, the processor carrying out: feature extraction process for extracting, by feature extractor, feature values from input image data; and class prediction process for predicting, by class predictor, class prediction values from the feature values, wherein at least one of the feature extractor and the class predictor has been trained with reference to converted feature values obtained by converting the feature values as if converted feature values are extracted from image data having different angles from the input image data.

In order to attain the object described above, a training method comprising: extracting, by one or more feature extractor, source domain feature values from input source domain image data, and target domain feature values from input target domain image data; generating, by one or more angle convertor, converted source domain feature values by converting the source domain feature values as if the converted source domain feature values are extracted from source domain image data having different angles from the input source domain image data, and converted target domain feature values by converting the target domain feature values as if the converted target domain feature values are extracted from target domain image data having different angles from the input target domain image data; predicting, by one or more class predictor, source domain class prediction values from the source domain feature values and the converted source domain feature values, and target domain class prediction values from the target domain feature values, and the converted target domain feature values; and updating at least one of (i) the one or more feature extractor, (ii) the one or more angle converter, and (iii) the one or more class predictor with reference to a source domain classification loss computed with reference to the source domain class prediction values, a target domain classification loss computed with reference to the target domain class prediction values, a conversion loss computed with reference to the source domain feature values, the converted source domain feature values, the target domain feature values and the converted target domain feature values, and a grouping loss computed with reference to the source domain feature values, the converted source domain feature values, the target domain feature values, and the converted target domain feature values.

In order to attain the object described above, a non-transitory storage medium storing therein a program for causing a computer to function as the training apparatus, the program causing the computer to carry out each of the feature extraction process, the class prediction process, the conversion process, and the updating process.

In order to attain the object described above, a non-transitory storage medium storing therein a program for causing a computer to function as the classification apparatus, the program causing the computer to carry out each of the feature extraction process, and the class prediction process.

Advantageous Effects of Invention

According to an example aspect of the present invention, it is possible to provide an efficient training process in a case where training images having a limited variation of shooting angles are available.

BRIEF DESCRIPTION OF DRAWINGS

FIG. 4 is a flowchart showing a flow of a classification method according to the first example embodiment.

FIG. 6 is diagram showing examples of input data in the second example embodiment.

FIG. 7 is diagram schematically showing the angle conversion in the second example embodiment.

FIG. 8 is diagram schematically showing a computation of the grouping loss in the second example embodiment.

FIG. 12 is a block diagram schematically showing an advantageous effect of the second example embodiment.

FIG. 15 is a flowchart showing a flow of a training method according to the third example embodiment.

FIG. 18 is a flowchart showing a flow of a training method according to the fourth example embodiment.

FIG. 20 is a block diagram illustrating a hardware configuration according to the example embodiments.

DESCRIPTION OF EMBODIMENTS

First Example Embodiment

The following description will discuss details of a first example embodiment according to the invention with reference to the drawings. The first example embodiment is an example embodiment which serves as the basis of the subsequent example embodiments.

Overview of First Example Embodiment

The training apparatus according to the first example embodiment trains a feature extraction section which extracts feature values from data that is inputted to the training apparatus. The training apparatus also trains an angle conversion section which generates converted feature values with reference to the feature values extracted by the feature extraction section. The training apparatus also trains a class prediction section which carries out classification based on the feature values and the converted feature values.

A classification apparatus according to the first example embodiment includes the feature extraction section, the angle conversion section, and the class prediction section which have been thus trained.

In the first example embodiment, data that belongs to a source domain and data that belongs to a target domain are used. Here, the term "domain" is used merely to conceptually discriminate between data sets, and does not limit the first example embodiment.

In the first example embodiment, the data belonging to the source domain is greater in data size than the data belonging to the target domain. Moreover, the data belonging to the source domain contains more labeled data, as compared with the data belonging to the target domain. Here, the term "labeled data" refers to data that is labeled with "ground truth". The labeled data can be used by the training apparatus for supervised learning or for semi-supervised learning.

The classification apparatus according to the first example embodiment is aimed at carrying out classification with respect to the data belonging to the target domain. In order to improve precision of the classification with respect to the data belonging to the target domain, the training apparatus according to the first example embodiment carries out a training process using not only the data belonging to the target domain but also the data belonging to the source domain.

(Configuration of Training Apparatus)

Figure 1:
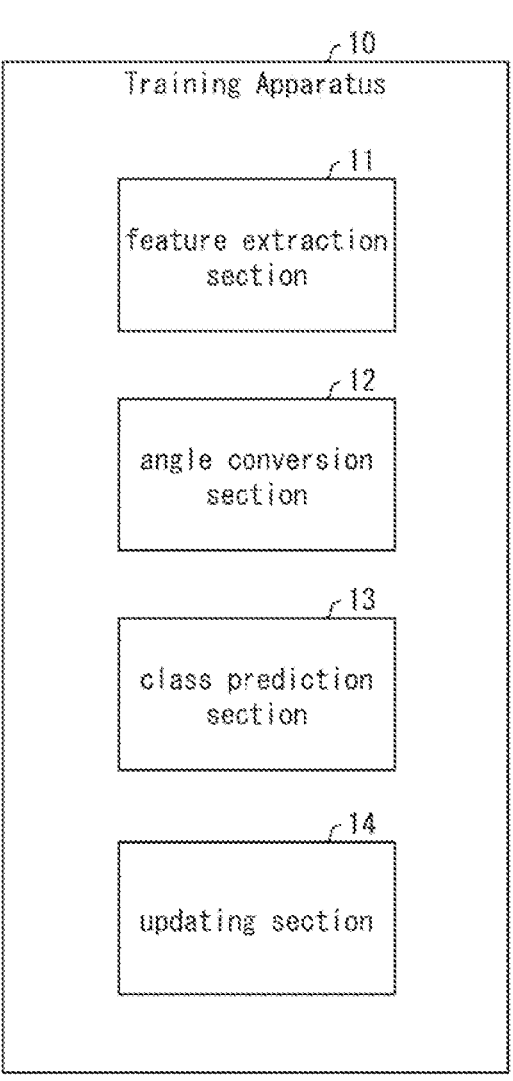
FIG. 1 is a block diagram illustrating a configuration of the training apparatus according to the first example embodiment.

The following description will discuss a configuration of a training apparatus 10 according to the first example embodiment with reference to FIG. 1. FIG. 1 is a block diagram illustrating a configuration of the training apparatus 10. As illustrated in FIG. 1, the training apparatus 10 includes a feature extraction section 11, an angle conversion section 12, a class prediction section 13, and an updating section 14. In the first example embodiment, the number of each of the feature extraction section 11, the angle conversion section 12, and the class prediction section 13 can be one or can be two or more.

The feature extraction section 11 is an example of feature extraction means recited in claims. The angle conversion section 12 is an example of angle conversion means recited in claims. The class prediction section 13 is an example of prediction means recited in claims. The updating section 14 is an example of updating means recited in claims.

To the feature extraction section 11, source domain image data and target domain image data are inputted. Here, the source domain image data is image data belonging to the source domain, and the target domain image data is image data belonging to the target domain.

The feature extraction section 11 extracts source domain feature values from input source domain image data. The feature extraction section 11 also extracts target domain feature values from input target domain image data.

Here, in a case where the number of the feature extraction section 11 is one, it is preferable to employ a configuration in which a domain label for discriminating between the source domain data and the target domain data is inputted to the feature extraction section 11 so that the feature extraction section 11 can discriminate between the source domain data and the target domain data based on the domain label.

Note that a specific configuration of the feature extraction section 11 does not limit the first example embodiment. For example, the feature extraction section 11 can be a convolutional neural network (CNN), can be a recurrent neural network (RNN), or can be any of other neural networks or feature extractors.

The angle conversion section 12 generates converted source domain feature values by converting the source domain feature values as if the converted source domain feature values are extracted from source domain image data having different angles from the input source domain image data. The angle conversion section 12 also generates converted target domain feature values by converting the target domain feature values as if the converted target domain feature values are extracted from target domain image data having different angles from the input target domain image data.

Although a specific configuration of the angle conversion section 12 does not limit the first example embodiment, it is possible to employ the following exemplary configuration.

The angle conversion section 12 may generate the converted source domain feature values with reference to one or more source domain angle conversion parameters. The angle conversion section 12 may also generate the converted target domain feature values with reference to one or more target domain angle conversion parameters.

For example, the angle conversion section 12 generates the converted source domain feature values with reference to the source domain angle conversion parameters, the converted source domain feature values resembling source domain feature values extracted from rotated source domain image data that have been rotated based on the source domain angle conversion parameters. In a similar manner, for example, the angle conversion section 12 generates the converted target domain feature values with reference to the target domain angle conversion parameters, the converted target domain feature values resembling target domain feature values extracted from rotated target domain image data that have been rotated based on the target domain angle conversion parameters.

The class prediction section 13 predicts source domain class prediction values from the source domain feature values and the converted source domain feature values. The class prediction section 13 also predicts target domain class prediction values from the target domain feature values and the converted target domain feature values.

Here, a specific configuration of the class prediction section 13 does not limit the first example embodiment. For example, the class prediction section 13 can be configured to (i) output source domain class prediction values by comparing the source domain feature values with a certain threshold and (ii) output target domain class prediction values by comparing the target domain feature values with another threshold.

The updating section 14 updates at least one of the feature extraction section 11, the angle conversion section 12, and the class prediction section 13 with reference to a source domain classification loss, a target domain classification loss, a conversion loss and a grouping loss. For example, the updating section 14 updates parameters with reference to the source domain classification loss, the target domain classification loss, the conversion loss and the grouping loss, and provides the updated parameters to the feature extraction section 11, the angle conversion section 12, and the class prediction section 13.

The source domain classification loss may be computed with reference to the source domain class prediction values. For example the source domain classification loss may be computed with reference to the source domain class prediction values and source domain class label data.

The target domain classification loss may be computed with reference to the target domain class prediction values. For example the target domain classification loss may be computed with reference to the target domain class prediction values and target domain class label data.

The source domain conversion loss may be computed with reference to the source domain feature values and the converted source domain feature values. For example the source domain conversion loss may be the value difference between the source domain feature values and the converted source domain features values.

The target domain conversion loss may be computed with reference to the target domain feature values and the converted target domain feature values. For example the target domain conversion loss may be the value difference between the target domain feature values and the converted target domain features values.

The conversion loss may be computed with reference to the source domain conversion loss and the target domain conversion loss.

The grouping loss may be computed with reference to the source domain feature values, the converted source domain feature values, the target domain feature values, and the converted target domain feature values.

(Advantageous Effect)

According to the first example embodiment, as mentioned above, the updating section 14 updates at least one of the feature extraction section 11, the angle conversion section 12, and the class prediction section 13 with reference to the grouping loss in addition to the source domain classification loss, the target domain classification loss and the conversion loss. Therefore, according to the first example embodiment, knowledge obtained from the source domain is to be used also for training in the target domain. Thus, according to the first example embodiment, the feature extraction section 11 and the class prediction section 12 can be trained even in a case where a small amount of labeled data for target domain is available.

Furthermore, according to the first example embodiment, the angle conversion section 12 generates converted source domain feature values $X'^S$ by converting the source domain feature values $X^S$ as if the converted source domain feature values $X'^S$ are extracted from source domain image data having different angles from the input source domain image data $I^S$. The angle conversion section 12 also generates converted target domain feature values $X'^T$ by converting the target domain feature values $X^T$ as if the converted target domain feature values $X'^T$ are extracted from target domain image data having different angles from the input target domain image data $I^T$. Then, the converted source domain feature values $X'^S$ and the converted target domain feature values $X'^T$ are referred to by the class prediction section 13.

Therefore, according to the first example embodiment, the class prediction section 13 can be trained such that the class prediction section 13 can provide an appropriate class prediction for various shooting angles.

More particularly, the prediction section 13 can be trained such that the class prediction section 13 can provide an appropriate class prediction for unlabeled input image data having a shooting angle different from that of training image data.

In other words, according to the first example embodiment, the training apparatus 10 provides an efficient training process in a case where training images having a limited variation of shooting angles are available.

(Training Method by Training Apparatus)

Figure 2:
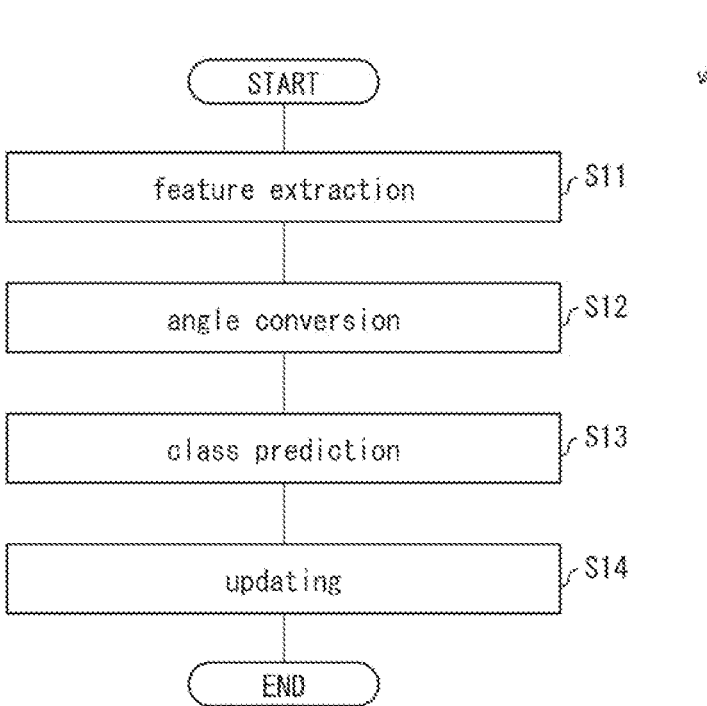
FIG. 2 is a flowchart showing a flow of a training method according to the first example embodiment.

The following description will discuss a training method carried out by the training apparatus 10 according to the first example embodiment with reference to FIG. 2. FIG. 2 is a flowchart showing a flow of a training method S1 carried out by the training apparatus 10. As shown in FIG. 2, the training apparatus 10 carries out a feature extraction step S11, an angle conversion step S12, a class prediction step S13, and an updating step S14.

(Feature Extraction Step S11)

In the feature extraction step S11, the feature extraction section 11 extracts source domain feature values from input source domain image data. The feature extraction section 11 also extracts target domain feature values from input target domain image data.

(Angle Conversion Step S12)

In the class prediction step S12, the angle conversion section 12 generates converted source domain feature values by converting the source domain feature values as if the converted source domain feature values are extracted from source domain image data having different angles from the input source domain image data. The angle conversion section 12 also generates converted target domain feature values by converting the target domain feature values as if the converted target domain feature values are extracted from target domain image data having different angles from the input target domain image data.

(Class Prediction Step S13)

In the Class prediction step S13, the class prediction section 13 predicts source domain class prediction values from the source domain feature values and the converted source domain feature values. The class prediction section 13 also predicts target domain class prediction values from the target domain feature values and the converted target domain feature values.

(Updating Step S14)

In the updating step S14, the updating section updates at least one of the feature extraction section 11, the angle conversion section 12, and the class prediction section 13 with reference to a source domain classification loss computed with reference to the source domain class prediction values, a target domain classification loss computed with reference to the target domain class prediction values, a conversion loss computed with reference to the source domain feature values, the converted source domain feature values, the target domain feature values and the converted target domain feature values, and a grouping loss computed with reference to the source domain feature values, the converted source domain feature values, the target domain feature values, and the converted target domain feature values.

(Advantageous Effect)

According to the first example embodiment, the training method S10 provides an efficient training process in a case where training images having a limited variation of shooting angles are available.

(Configuration of Classification Apparatus)

Figure 3:
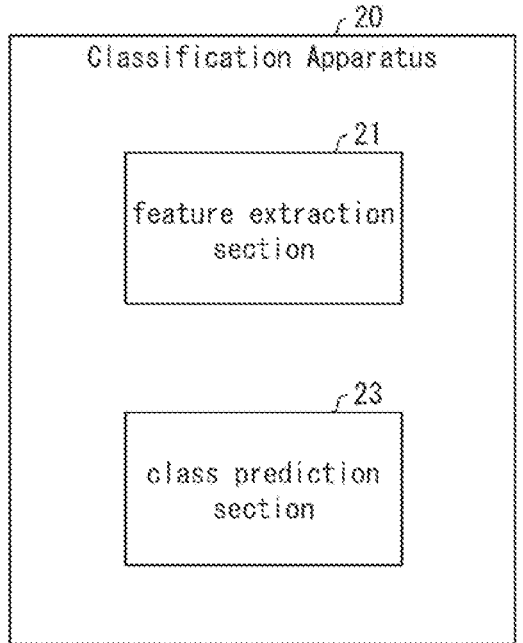
FIG. 3 is a block diagram illustrating a configuration of the classification according to the first example embodiment.

The following description will discuss a configuration of a classification apparatus 20 according to the first example embodiment with reference to FIG. 3. FIG. 3 is a block diagram illustrating a configuration of the classification apparatus 20. As illustrated in FIG. 3, the classification apparatus 20 includes a feature extraction section 21, and a class prediction section 23.

The feature extraction section 21 extracts feature values from input image data. Note here that the feature extraction section 21 is the feature extraction section 11 that has been trained by the training apparatus 10.

The class prediction section 23 predicts class prediction values from the feature values. Note here that the class prediction section 23 is the class prediction section 13 that has been trained by the training apparatus 10.

As mentioned above, according to the first example embodiment, at least one of the feature extraction section 21 and the class prediction section 23 has been trained with reference to converted feature values obtained by converting the feature values as if the converted feature values are extracted from image data having different angles from the input image data.

(Advantageous Effect)

According to the first example embodiment, the classification apparatus 20 provides a preferable classification process even in a case where training images having a limited variation of shooting angles are available.

(First Remark for the Classification Apparatus 20)

The classification apparatus 20 may further comprise an angle conversion section 22 which generates converted feature values by converting the feature values as if the converted feature values are extracted from image data having different angles from the input image data. Note here that the angle conversion section 22 may be the angle conversion section 12 that has been trained by the training apparatus 10.

In the above configuration, the class prediction section 23 may predict class prediction values from the feature values and the converted feature values.

According to the above configuration, the classification apparatus 20 provides a more preferable classification process even in a case where training images having a limited variation of shooting angles are available.

(Second Remark for the Classification Apparatus 20)

In addition to the angle conversion section 22, the classification apparatus 20 may further comprise a user input receiving section which receives the user input. The user input may be an input which indicates whether the user chooses to use the angle conversion section 22 or not to use the angle conversion section 22.

If the user input indicates that the user chooses to use the angle conversion section 22, the class prediction section 23 may predict class prediction values from the feature values and the converted feature values.

On the other hand, if the user input indicates that the user chooses not to use the angle conversion section 22, the class prediction section 23 may predict class prediction values from the feature values but not from the converted feature values.

(Classification Method by Classification Apparatus)

Figure 4:
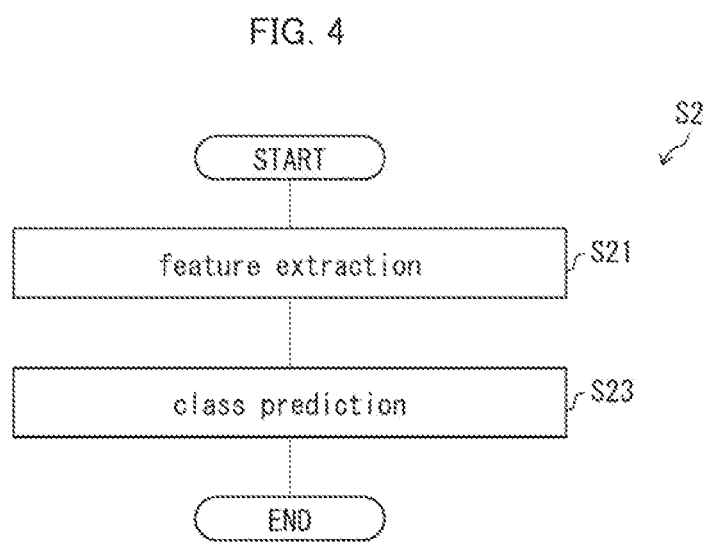

The following description will discuss a classification method carried out by the classification apparatus 20 according to the first example embodiment with reference to FIG. 4. FIG. 4 is a flowchart showing a classification method S2 carried out by the classification apparatus 20. As shown in FIG. 4, the classification apparatus 20 carries out a feature extraction step S21, a prediction step S23.

(Feature Extraction Step S21)

In the feature extraction step S21, the feature extraction section 21 extracts feature values from input image data.

(Class Prediction Step S23)

In the class prediction step S23, the class prediction section 23 predicts class prediction values from the feature values.

As mentioned above, according to the first example embodiment, at least one of the feature extraction section 21 and the class prediction section 23 has been trained with reference to converted feature values obtained by converting the feature values as if the converted feature values are extracted from image data having different angles from the input image data.

According to the first example embodiment, the classification method S2 provides a preferable classification process even in a case where training images having a limited variation of shooting angles are available.

(First Remark for the Classification Method S2)

The classification method S2 may further comprise an angle conversion step S22 which generates converted feature values by converting the feature values as if the converted feature values are extracted from image data having different angles from the input image data. Note here that the angle conversion step S22 may be performed by the angle conversion section 22. Here the angle conversion section 22 may be the angle conversion section 12 that has been trained by the training apparatus 10.

In the above configuration, the class prediction step S23 may predict class prediction values from the feature values and the converted feature values.

According to the above method, the classification method S2 provides a more preferable classification process even in a case where training images having a limited variation of shooting angles are available.

(Second Remark for the Classification Method S2)

In addition to the angle conversion step S22, the classification method S2 may further comprise a user input receiving step which receives the user input. The user input may be an input which indicates whether the user chooses to employ the angle conversion step S22 or not to employ the angle conversion step S22.

If the user input indicates that the user chooses to employ the angle conversion step S22, the class prediction step S23 may predict class prediction values from the feature values and the converted feature values.

On the other hand, if the user input indicates that the user chooses not to employ the angle conversion step S22, the class prediction step S23 may predict class prediction values from the feature values but not from the converted feature values.

Second Example Embodiment

The following description will discuss details of a second example embodiment of the invention with reference to the drawings. Note that the same reference numerals are given to elements having the same functions as those described in the first example embodiment, and descriptions of such elements are omitted as appropriate. Moreover, an overview of the second example embodiment is the same as the overview of the first example embodiment, and is thus not described here.

(Configuration of Training Apparatus)

Figure 5:
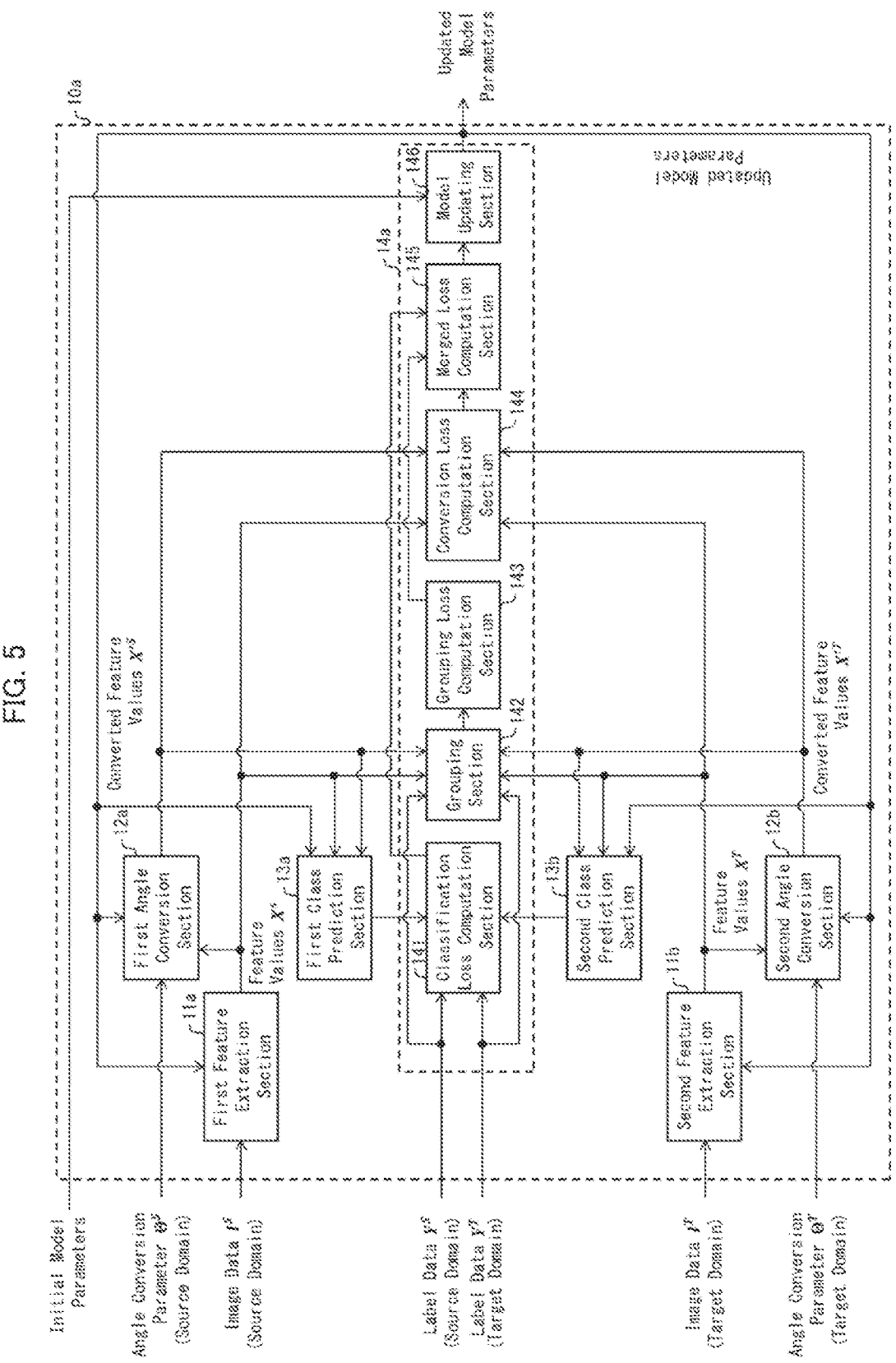
FIG. 5 is a block diagram illustrating a configuration of the training apparatus according to the second example embodiment.

The following description will discuss a configuration of a training apparatus 10a according to the second example embodiment with reference to FIG. 5. FIG. 5 is a block diagram illustrating a configuration of the training apparatus 10a. As illustrated in FIG. 5, the training apparatus 10a includes a first feature extraction section 11a, a second feature extraction section 11b, a first angle conversion section 12a, a second angle conversion section 12b, a first class prediction section 13a, a second class prediction section 13b, and an updating section 14a.

The first feature extraction section 11a and the second feature extraction section 11b are examples of the feature extraction means recited in claims. The first angle conversion section 12a and the second angle conversion section 12b are examples of the angle conversion means recited in claims. The first class prediction section 13a and the second class prediction section 13b are examples of the class prediction means recited in claims. The updating section 14a is an example of the updating means recited in claims.

The first feature extraction section 11a and the second feature extraction section 11b can be configured as a single section. The first angle conversion section 12a and the second angle conversion section 12b can be configured as a single section. The first class prediction section 13a and the second class prediction section 13b can be configured as a single section.

Moreover, as illustrated in FIG. 5, the updating section 14a includes a classification loss computation section 141, a grouping section 142, a grouping loss computation section 143, a conversion loss computation section 144, a merged loss computation section 145, and a model updating section 146.

(First Feature Extraction Section)

To the first feature extraction section 11a, input image data $I^S$ belonging to a source domain is inputted. More specifically, as an example, input image data $I^S$ may be an image which has a plurality of regions. As another example, the input image data $I^S$ may be a batch of images as depicted on the left side of FIG. 6. In the example on the left side of FIG. 6, the input image data $I^S$ includes 4 images ($I^{S1}$, $I^{S2}$, $I^{S3}$, $I^{S4}$), each of which represents an object.

Here a relation of the images $I^{S1}$ and $I^{S2}$ is as follows. The image $I^{S2}$ has a different angle from the image $I^{S1}$. As an example, the image $I^{S2}$ may be an image which contains a same object as the image $I^{S1}$ but has been taken at a different shooting angle from the image $I^{S1}$. The images $I^{S1}$ and $I^{S2}$ may be taken at the same time or at different times. As a specific example, the image $I^{S1}$ has an angle of 0 degree, while the image $I^{S2}$ has an angle of +30 degrees as shown on the left side of FIG. 6. In other words, the image $I^{S1}$ has an angle of −30 degrees as compared with the image $I^{S2}$.

In a similar manner, a relation of the images $I^{S3}$ and $I^{S4}$ is as follows. The image $I^{S4}$ has a different angle from the image $I^{S3}$. As an example, the image $I^{S4}$ may be an image which contains a same object as the image $I^{S3}$ but has been taken at a different shooting angle from the image $I^{S3}$. The images $I^{S3}$ and $I^{S4}$ may be taken at the same time or at different times. As a specific example, the image $I^{S3}$ has an angle of 0 degree, while the image $I^{S4}$ has an angle of +30 degrees as shown on the left side of FIG. 6. In other words, the image $I^{S3}$ has an angle of −30 degrees as compared with the image $I^{S4}$.

The first feature extraction section 11a extracts source domain feature values $X^S$ from the input source domain image data $I^S$. The feature values $X^S$ extracted by the first feature extraction section 11a are supplied to the first angle conversion section 12a, the first class prediction section 13a, the grouping section 142, and the conversion loss computation section 144.

Note that a specific configuration of the first feature extraction section 11a does not limit the second example embodiment. For example, the first feature extraction section 11a can be a convolutional neural network (CNN), can be a recurrent neural network (RNN), or can be any of other neural networks or feature extractors.

Although the data structure of the feature values $X^S$ does not limit the second example embodiment, the feature values $X^S$ may be expressed as a form of a vector. More specifically, as an example, $X^S$ may be expressed as a vector such as follows.

[Math.1]

$$X^S = [x_{s1}, x_{s2}, x_{s3}, x_{s4}] \tag{Eq.1}$$

Here, $X^S$ has 4 components, which correspond to the respective input images ($I^{S1}$, $I^{S2}$, $I^{S3}$, $I^{S4}$). Since the feature values may be expressed as a vector, the feature values may be referred to as a feature vector.

(Second Feature Extraction Section)

To the second feature extraction section 11b, input image data $I^T$ belonging to a target domain is inputted. More specifically, as an example, input image data $I^T$ may be an image which has a plurality of regions. As another example, the input image data $I^T$ may be a batch of images as depicted on the right side of FIG. 6. In the example on the right side of FIG. 6, the input image data $I^T$ includes 4 images ($I^{T1}$, $I^{T2}$, $I^{T3}$, $I^{T4}$), each of which represents an object.

Here a relation of the images $I^{T1}$ and $I^{T2}$ is as follows. The image $I^{T2}$ has a different angle from the image $I^{T1}$. As an example, the image $I^{T2}$ may be an image which contains a same object as the image $I^{T1}$ but has been taken at a different shooting angle from the image $I^{T1}$. The images $I^{T1}$ and $I^{T2}$ may be taken at the same time or at different times. As a specific example, the image $I^{T1}$ has an angle of 0 degree, while the image $I^{T2}$ has an angle of +30 degrees as shown on the right side of FIG. 6. In other words, the image $I^{T1}$ has an angle of −30 degrees as compared with the image $I^{T2}$.

In a similar manner, a relation of the images $I^{T3}$ and $I^{T4}$ is as follows. The image $I^{T4}$ has a different angle from the image $I^{T3}$. As an example, the image $I^{T4}$ may be an image which contains a same object as the image $I^{T3}$ but has been taken at a different shooting angle from the image $I^{T3}$. The images $I^{T3}$ and $I^{T4}$ may be taken at the same time or at different times. As a specific example, the image $I^{T3}$ has an angle of 0 degree, while the image $I^{T4}$ has an angle of +30 degrees as shown on the right side of FIG. 6. In other words, the image $I^{T3}$ has an angle of −30 degrees as compared with the image $I^{T4}$.

The second feature extraction section 11b extracts target domain feature values $X^T$ from the input target domain image data $I^T$. The feature values $X^T$ extracted by the second feature extraction section 11b are supplied to the second angle conversion section 12b, the second class prediction section 13b, the grouping section 142, and the conversion loss computation section 144.

Note that a specific configuration of the second feature extraction section 11b does not limit the second example embodiment. For example, the second feature extraction section 11b can be a convolutional neural network (CNN), can be a recurrent neural network (RNN), or can be any of other neural networks or feature extractors.

Although the data structure of the feature values $X^T$ does not limit the second example embodiment, the feature values $X^T$ may be expressed as a form of a vector. More specifically, as an example, $X^T$ may be expressed as a vector such as follows.

[Math.2]

$$X^T = [x_{T1}, x_{T2}, x_{T3}, x_{T4}] \tag{Eq.2}$$

Here, $X^T$ has 4 components, which correspond to the respective input images ($I^{T1}$, $I^{T2}$, $I^{T3}$, $I^{T4}$)

(First Angle Conversion Section)

The first angle conversion section 12a generates converted source domain feature values $X'^S$ by converting the source domain feature values $X^S$ as if the converted source domain feature values $X'^S$ are extracted from source domain image data having different angles from the input source domain image data $I^S$.

In other words, the first angle conversion section 12a generates converted source domain feature values $X'^S$ by converting the source domain feature values $X^S$ such that the converted source domain feature values $X'^S$ resemble source domain feature values extracted from image data having different angles from the input source domain image data $I^S$.

The converted source domain feature values $X'^S$ generated by the first angle conversion section 12a are supplied to the first class prediction section 13a, the grouping section 142, and the conversion loss computation section 144.

Note that a specific configuration of the first angle conversion section 12a does not limit the second example embodiment. For example, the first angle conversion section 12a can be a convolutional neural network (CNN), can be an auto-encoder, or can be any of other neural networks or a combination thereof.

Although the specific configuration of the first angle conversion section 12a does not limit the second example embodiment, for example, the first angle conversion section 12a may generate the converted source domain feature values $X'^S$ with reference to one or more source domain angle conversion parameters $\Theta^S$.

As a more specific example, the first angle conversion section 12a may refer to the source domain angle conversion parameters $\Theta^S$ as follows.

[Math.3]

$$\Theta^S = [+30°, -30°, +30°, -30°] \tag{Eq.3}$$

Since the angle conversion parameters may be expressed as a vector, the angle conversion parameters may be referred to as an angle conversion vector. With reference to the $\Theta^S$, the first angle conversion section 12a may generate the converted source domain feature vector $X'^S$ as follows.

[Math.4]

$$X'^S = [x_{s1+30°}, x_{s2-30°}, x_{s3+30°}, x_{s4-30°}] \tag{Eq.4}$$

Here, the first component of $X'^S$ of Eq. 4 indicates a converted feature value generated by the first angle conversion section 12a with reference to the first component of the source domain feature vector $X^S$ of Eq. 1 and the first component of the source domain angle conversion vector $\Theta^S$ of Eq. 3.

The first angle conversion section 12a generates the first component of $X'^S$ of Eq. 4 by converting the first component of $X^S$ of Eq. 1 as if the first component of $X'^S$ is extracted from $I^{S2}$. In other words, the first angle conversion section 12a generates the first component of $X'^S$ of Eq. 4 by converting the first component of $X^S$ of Eq. 1 such that the first component of $X'^S$ resembles the second component of $X^S$ of Eq. 1.

The second component of $X'^S$ of Eq. 4 indicates a converted feature value generated by the first angle conversion section 12a with reference to the second component of the source domain feature vector $X^S$ of Eq. 1 and the second component of the source domain angle conversion vector $\Theta^S$ of Eq. 3.

The first angle conversion section 12a generates the second component of $X'^S$ of Eq. 4 by converting the second component of $X^S$ of Eq. 1 as if the second component of $X'^S$ is extracted from $I^{S1}$. In other words, the first angle conversion section 12a generates the second component of $X'^S$ of Eq. 4 by converting the second component of $X^S$ of Eq. 1 such that the second component of $X'^S$ resembles the first component of $X^S$ of Eq. 1.

In a similar manner, the third and fourth components of the converted source domain feature vector $X'^S$ of Eq. 4 are generated as if the third and fourth components of $X'^S$ are extracted from $I^{S4}$ and $I^{S3}$, respectively. In other words, the third and fourth components of the converted source domain feature vector $X'^S$ of Eq. 4 are generated such that the third and fourth components of $X'^S$ resemble the fourth and third components of $X^S$ of Eq. 1, respectively.

The top of FIG. 7 schematically shows the angle conversion by the first angle conversion section 12a. As explained above, the first angle conversion section 12a generates $X'^S$ such that the first, second, third, and fourth components of $X'^S$ resemble the second, first, fourth, and third components of $X^S$, respectively.

Note that as explained later on, a degree of similarity between a source domain feature value and the corresponding converted source domain feature value may be increased as a training of the first angle conversion section 12a proceeds.

(Second Angle Conversion Section)

The second angle conversion section 12b generates converted target domain feature values $X'^T$ by converting the target domain feature values $X^T$ as if the converted target domain feature values $X'^T$ are extracted from target domain image data having different angles from the input target domain image data $I^T$.

In other words, the second angle conversion section 12b generates converted target domain feature values $X'^T$ by converting the target domain feature values $X^T$ such that the converted target domain feature values $X'^T$ resemble target domain feature values extracted from image data having different angles from the input target domain image data $I^T$.

The converted target domain feature values $X'^T$ generated by the second angle conversion section 12b are supplied to the second class prediction section 13b, the grouping section 142, and the conversion loss computation section 144.

Note that a specific configuration of the second angle conversion section 12b does not limit the second example embodiment. For example, the second angle conversion section 12b can be a convolutional neural network (CNN), can be an auto-encoder, or can be any of other neural networks or a combination thereof.

Although the specific configuration of the second angle conversion section 12b does not limit the second example embodiment, for example, the second angle conversion section 12b may generate the converted target domain feature values $X'^T$ with reference to one or more target domain angle conversion parameters $\Theta^T$.

As a more specific example, the second angle conversion section 12b may refer to the target domain angle conversion parameters $\Theta^T$ as follows.

[Math.5]

$$\Theta^T=[+30°,-30°,+30°,--30°] \qquad \text{(Eq.5)}$$

With reference to the $\Theta^T$, the second angle conversion section 12b may generate the converted target domain feature vector $X'^T$ as follows.

[Math.6]

$$X'^T=[x_{T1+30°},x_{T2-30°},x_{T3+30°},x_{T4-30}°] \qquad \text{(Eq.6)}$$

Here, the first component of $X'^T$ of Eq. 6 indicates a converted feature value generated by the second angle conversion section 12b with reference to the first component of the target domain feature vector $X^T$ of Eq. 2 and the first component of the target domain angle conversion vector $\Theta^T$ of Eq. 5.

The second angle conversion section 12b generates the first component of $X'^T$ of Eq. 6 by converting the first component of $X^T$ of Eq. 2 as if the first component of $X'^T$ is extracted from $I^{T2}$. In other words, the second angle conversion section 12b generates the first component of $X'^T$ of Eq. 6 by converting the first component of $X^T$ of Eq. 2 such that the first component of $X'^T$ resembles the second component of $X^T$ of Eq. 2.

The second component of $X'^T$ of Eq. 6 indicates a converted feature value generated by the second angle conversion section 12b with reference to the second component of the target domain feature vector $X^T$ of Eq. 2 and the second component of the target domain angle conversion vector $\Theta^T$ of Eq. 5.

The second angle conversion section 12b generates the second component of $X'^T$ of Eq. 6 by converting the second component of $X^T$ of Eq. 2 as if the second component of $X'^T$ is extracted from $I^{T1}$. In other words, the second angle conversion section 12b generates the second component of $X'^T$ of Eq. 6 by converting the second component of $X^T$ of Eq. 2 such that the second component of $X'^T$ resembles the first component of $X^T$ of Eq. 2.

In a similar manner, the third and fourth components of the converted target domain feature vector $X'^T$ of Eq. 6 are generated as if the third and fourth components of $X'^T$ are extracted from $I^{T4}$ and $I^{T3}$, respectively. In other words, the third and fourth components of the converted target domain feature vector $X'^T$ of Eq. 6 are generated such that the third and fourth components of $X'^T$ resemble the fourth and third components of $X^T$ of Eq. 2, respectively.

The middle of FIG. 7 schematically shows the angle conversion by the second angle conversion section 12b. As explained above, the second angle conversion section 12b generates $X'^T$ such that the first, second, third, and fourth components of $X'^T$ resemble the second, first, fourth, and third components of $X^T$, respectively.

Note that as explained later on, a degree of similarity between a target domain feature value and the corresponding converted target domain feature value may be increased as a training of the second angle conversion section 12b proceeds.

(First Class Prediction Section)

The first class prediction section 13*a* predicts source domain class prediction values from the source domain feature values extracted by the first feature extraction section 11*a* and from the converted source domain feature values generated by the first angle conversion section 12*a*.

More particularly, the first class prediction section 13*a* predicts source domain class prediction values $P^S$ from the source domain feature values $X^S$ extracted by the first feature extraction section 11*a* and predicts source domain class prediction values of the converted feature values CPS from the converted source domain feature values $X'^S$ generated by the first angle conversion section 12*a*.

The source domain class prediction values $P^S$ and the source domain class prediction values of the converted feature values $CP^S$ which have been outputted by the first class prediction section 13*a* are supplied to the classification loss computation section 141.

Here, a specific configuration of the first class prediction section 13*a* does not limit the second example embodiment. For example, it is possible to employ a configuration in which a corresponding component of the source domain class prediction values $P^S$ is determined by comparing each component of the source domain feature vector $X^S$ with a certain threshold and a corresponding component of the source domain class prediction values of the converted feature values $CP^S$ is determined by comparing each component of the converted source domain feature vector $X'^S$ with another threshold.

As a specific example, from the source domain feature vector $X^S$ as indicated in (Eq. 1), and from the converted source domain feature vector $X'^S$ as indicated in (Eq. 4), the first class prediction section 13*a* may output the source domain class prediction values $P^S$ and the source domain class prediction values of the converted feature values $CP^S$ as follows.

[Math.7]

$$P^S=[0,0,1] \qquad (Eq.7)$$

$$CP^S=[0,0,1,1] \qquad (Eq. 7.1)$$

Here, $P^S$ has 4 components, which correspond to respective components of the feature vector $X^S$. Similarly, $CP^S$ has 4 components, which correspond to respective components of the converted feature vector $X'^S$. Since the prediction values may be expressed as a vector, the prediction values may be referred to as a prediction vector.

(Second Class Prediction Section)

The second class prediction section 13*b* predicts target domain class prediction values $P^T$ from the target domain feature values $X^T$ extracted by the second feature extraction section 11*b* and target domain class prediction values of the converted feature values $CP^T$ from the converted target domain feature values $X'^T$ generated by the second angle conversion section 12*b*.

The target domain class prediction values $P^T$ and the target domain class prediction values of the converted feature values $CP^T$ which have been outputted by the second class prediction section 13*b* are supplied to the classification loss computation section 141.

Here, a specific configuration of the second class prediction section 13*b* does not limit the second example embodiment. For example, it is possible to employ a configuration in which a corresponding component of the target domain class prediction values $P^T$ is determined by comparing each component of the target domain feature vector $X^T$ with a certain threshold and a corresponding component of the target domain class prediction values of the converted feature values $CP^T$ is determined by comparing each component of the converted target domain feature vector $X'^T$ with another threshold.

As a specific example, from the target domain feature vector $X^T$ as indicated in (Eq. 2), and from the converted target domain feature vector $X'^T$ as indicated in (Eq. 6), the second class prediction section 13*b* may output the target domain class prediction values $P^T$ and the target domain class prediction values of the converted feature values $CP^T$ as follows.

[Math.8]

$$P^T=[0,0,1,0] \qquad (Eq.8)$$

$$CP^T=[1,0,1,0] \qquad (Eq. 8.1)$$

Here, $P^T$ has 4 components, which correspond to respective components of the feature vector $X^T$. Similarly, $CP^T$ has 4 components, which correspond to respective components of the converted feature vector $X'^T$.

(Classification Loss Computation Section)

The classification loss computation section 141 computes a source domain classification loss (Loss_classification_S) with reference to the source domain class prediction values and source domain class label data.

More particularly, the classification loss computation section 141 computes a source domain classification loss (Loss_classification_S) with reference to the source domain class prediction values $P^S$, the source domain class prediction values of the converted feature values $CP^S$ and source domain class label data $Y^S$ For example, the classification loss computation section 141 computes a source domain classification loss according to a degree of mismatch between $P^S$ and $Y^S$, and mismatch between $CP^S$ and $Y^S$.

As a specific example, in a case where $P^S$ is given by Eq. 7 and $Y^S$ is given by the following Eq. 9:

[Math.9]

$$Y^S=[0,0,1,1] \qquad (Eq.9)$$

the classification loss computation section 141 computes the source domain classification loss as below, because all the components of $P^S$ match the respective corresponding components of $Y^S$, and all the components of $CP^S$ match the respective corresponding components of $Y^S$.

[Math.10]

$$\text{Loss}_{classification\ S}=0 \qquad (Eq. 10)$$

The classification loss computation section 141 also computes a target domain classification loss (Loss_classification_T) with reference to the target domain class prediction values and target domain class label data.

More particularly, the classification loss computation section 141 also computes a target domain classification loss (Loss_classification_T) with reference to the target domain class prediction values $P^T$, the target domain class prediction values of the converted feature values $CP^T$ and target domain class label data YT.

For example, the classification loss computation section 141 computes a target domain classification loss according to a degree of mismatch between $P^T$ and $Y^T$, and mismatch between $CP^T$ and $Y^T$.

As a specific example, in a case where $P^T$ is given by Eq. 8, $CP^T$ is given by Eq. 8.1 and $Y^T$ is given by the following Eq. 11:

[Math.11]

$$Y^T = [0,0,1,1] \qquad \text{(Eq.11)}$$

the classification loss computation section 141 computes the target domain classification loss as below, because the 4th component of $P^T$ and the 4th component of $Y^T$ do not match each other, and the 1st and the 4th components of $CP^T$ do not match the corresponding components of $Y^T$.

[Math.12]

$$\text{Loss}_{classification\ T} = 3 \qquad \text{(Eq.12)}$$

(Grouping Section)

The grouping section 142 generates and outputs, from source domain feature values $X^S$, the converted source domain feature values $X'^S$, the target domain feature values $X^T$, and the converted target domain feature values $X'^T$, class groups where each class group contains feature values sharing the same class label.

As a specific example, in a case where $X^S$ is given by Eq. 1, $X^T$ is given by Eq. 2, $X'^S$ is given by Eq. 4, and $X'^T$ is given by Eq. 6, the grouping section 142 outputs the following class groups (Gr0, Gr1).

[Math.13]

$$\text{Gr0}: x_{s1}, x_{s2}, x_{T1}, x_{T2}, X_{s1+30°}, x_{s2-30°}, x_{T1+30°}, x_{T2-30°}$$

$$\text{Gr1}: x_{s3}, x_{s4}, x_{T3}, X_{T4}, x_{s3+30°}, x_{s4-30°}, x_{T3+30°}, x_{T4-30°} \qquad \text{(Eq.13)}$$

Here, the Gr0 is a class group whose feature values share the same class label 0. The Gr1 is a class group whose feature values share the same class label 1.

(Grouping Loss Computation Section)

The grouping loss computation section 143 computes the grouping loss (Loss_grouping) with reference to the class groups generated by the grouping section 142.

For example, the grouping loss computation section 143 computes the grouping loss based on (i) intra class metrics determined with reference to the feature values in a same class and (ii) inter class metrics determined with reference to the feature values in different classes.

As a specific example, the grouping loss computation section 143 computes the grouping loss using the following mathematical formula.

[Math. 14]

$$\text{Loss}_{grouping} = \qquad \text{(Eq. 14)}$$
$$\frac{1}{n} \sum_{x \in (X^S \cup X^T)} ((\text{maximum of intra-class distance in}$$
$$\text{the feature space}) - (\text{minimum of inter-}$$
$$\text{class distance in the feature space}) + (\text{margin}))$$

Here, for each feature value x in a union set of all the source domain feature values and all the target domain feature values, a "maximum of intra-class distance in the feature space" of that feature value x is computed as the maximum distance between the feature value x and any other feature value which comes from the same class group as x, and a "minimum of inter-class distance in the feature space" is computed as the minimum distance between the feature value x and any other feature value which comes from a different class group from x. The margin indicates an allowable minimum value for the value computed by subtracting the feature value's maximum intra-class distance from the feature value's minimum inter-class distance. Hereinafter, the value computed for each feature value by (maximum of intra-class distance in the feature space− minimum of inter-class distance in the feature space+margin) is referred to as "individual grouping loss". The overall grouping loss is computed as the average of individual grouping loss for each source domain feature value and each target domain feature value. The average is computed by first computing the summation of the individual grouping loss for all source domain feature values and all target domain feature values, and then dividing the sum by the number of the source domain feature values plus the number of the target domain feature values.

More specifically, the computation of grouping loss (Loss_grouping) according to Eq. 14 may be expressed as follows.

The grouping loss computation section 143 may first find, for each feature value x, among all other feature values from the same class group as that feature value x, another feature value that is the most distant from that feature value x in the feature space. This type of pair may be referred to as an intra-class pair. The distance between the intra-class pair for each feature value corresponds to the "maximum of intra-class distance in the feature space" in Eq.14.

The grouping loss computation section 143 may then find, for each feature value x, among all other feature values from a different class group from that feature value x, another feature value that is the closest to that feature value x in the feature space. This type of pair may be referred to as an inter-class pair. The distance between the interclass pair for each feature value corresponds to the "minimum of inter-class distance in the feature space" in Eq.14.

Then, the grouping loss computation section 143 may subtract (minimum of interclass distance in the feature space) from (maximum of intra-class distance in the feature space) for each feature value.

The grouping loss computation section 143 may then add a margin. Adding the margin means that we want the quantity of (maximum of intra-class distance in the feature space) smaller than (minimum of inter-class distance in the feature space) to be at least a certain value (e.g. if margin=1, we want that, for each feature value, (maximum of intra-class distance in the feature space) to be at least 1 unit smaller than (minimum of inter-class distance in the feature space).

After carrying out the above calculation for each feature value, the grouping loss computation section 143 may then take the summation over all the feature values included in the union of $X^S$ and $X^T$.

The grouping loss computation section 143 may then divide the result of the summation by the number of all the feature values. The number of all the feature values is expressed as n in Eq. 14. As a specific example, in a case where we have the class groups of Eq. 13, we may take n=16.

(Conversion Loss Computation Section)

The conversion loss computation section 144 computes a conversion loss with reference to the source domain feature values $X^S$, the converted source domain feature values $X'^S$, the target domain feature values $X^T$, and the converted target domain feature values $X'^T$.

For example, the conversion loss computation section 144 may compute the conversion loss based on (i) differences between the source domain feature values $X^S$ and the corresponding converted source domain feature values $X'^S$ and (ii) differences between the target domain feature values $X^T$ and the corresponding converted target domain feature values $X'^T$.

As a specific example, in a case where $X^S$ is given by Eq. 1, $X^T$ is given by Eq. 2, $X'^S$ is given by Eq. 4, and $X'^T$ is given by Eq. 6, the conversion loss computation section 144 may compute the conversion loss (Loss_conversion) as follows.

[Math.15]

$$\text{Loss}_{conversion} = \|x_{s1} - x_{s2-30°}\| + \|x_{s2} - x_{s1+30°}\| + \|x_{s3} - x_{s4+30°}\| + \|x_{s4} - x_{s3+30°}\| + \|x_{T1} - x_{T2-30°}\| + \|x_{T2} - x_{T1+30°}\| + \|x_{T3} - x_{T4-30°}\| + \|x_{T4} - x_{T3+30°}\| \quad \text{(Eq. 15)}$$

Note that the above expression of the conversion loss may not limit the second example embodiment. For example, the conversion loss may be obtained separately for the source domain and the target domain.

(Merged Loss Computation Section)

The merged loss computation section 145 computes a merged loss (Loss_merge) with reference to the source domain classification loss (Loss_classification_S), the target domain classification loss (Loss_classification_T), the grouping loss (Loss_grouping), and the conversion loss (Loss_conversion).

For example, the merged loss computation section 145 computes a merged loss as follows.

[Math.16]

$$\text{Loss}_{merge} = \alpha \text{Loss}_{classification\ S} + \beta \text{Loss}_{classification\ T} + \gamma \text{Loss}_{grouping} + \delta \text{Loss}_{conversion} \quad \text{(Eq. 16)}$$

Here, the coefficients $\alpha$, $\beta$, $\gamma$, and $\delta$ indicate weight coefficients whose specific values do not limit the second example embodiment.

(Model Updating Section 146)

The model updating section 146 determines whether the merged loss is converged or not. If the merged loss is converged, the model updating section 146 outputs the converged model parameters to a storage medium. If the merged loss is not converged, the model updating section 146 updates model parameters for the first feature extraction section 11a, the second feature extraction section 11b, the first angle conversion section 12a, the second angle conversion section 12b, the first class prediction section 13a, and the second class prediction section 13b, with reference to the merged loss computed by the merged loss computation section 145.

For example, the model updating section 146 updates the model parameters such that the merged loss decreases. Although updating methods adopted by the model updating section 146 do not limit the second example embodiment, the model updating section 146 may update the model parameters according to a back propagation method.

The model parameters updated by the model updating section 146 are supplied to the first feature extraction section 11a, the second feature extraction section 11b, the first angle conversion section 12a, the second angle conversion section 12b, the first class prediction section 13a, and the second class prediction section 13b.

(Advantageous Effect)

According to the second example embodiment, as mentioned above, the model updating section 146 updates the model parameters with reference to the grouping loss in addition to the source domain classification loss and the target domain classification loss and the conversion loss.

Therefore, according to the second example embodiment, source domain features and target domain features preferably overlap each other, while features belonging to different classes are preferably separated for each class in a feature space.

Figure 9:
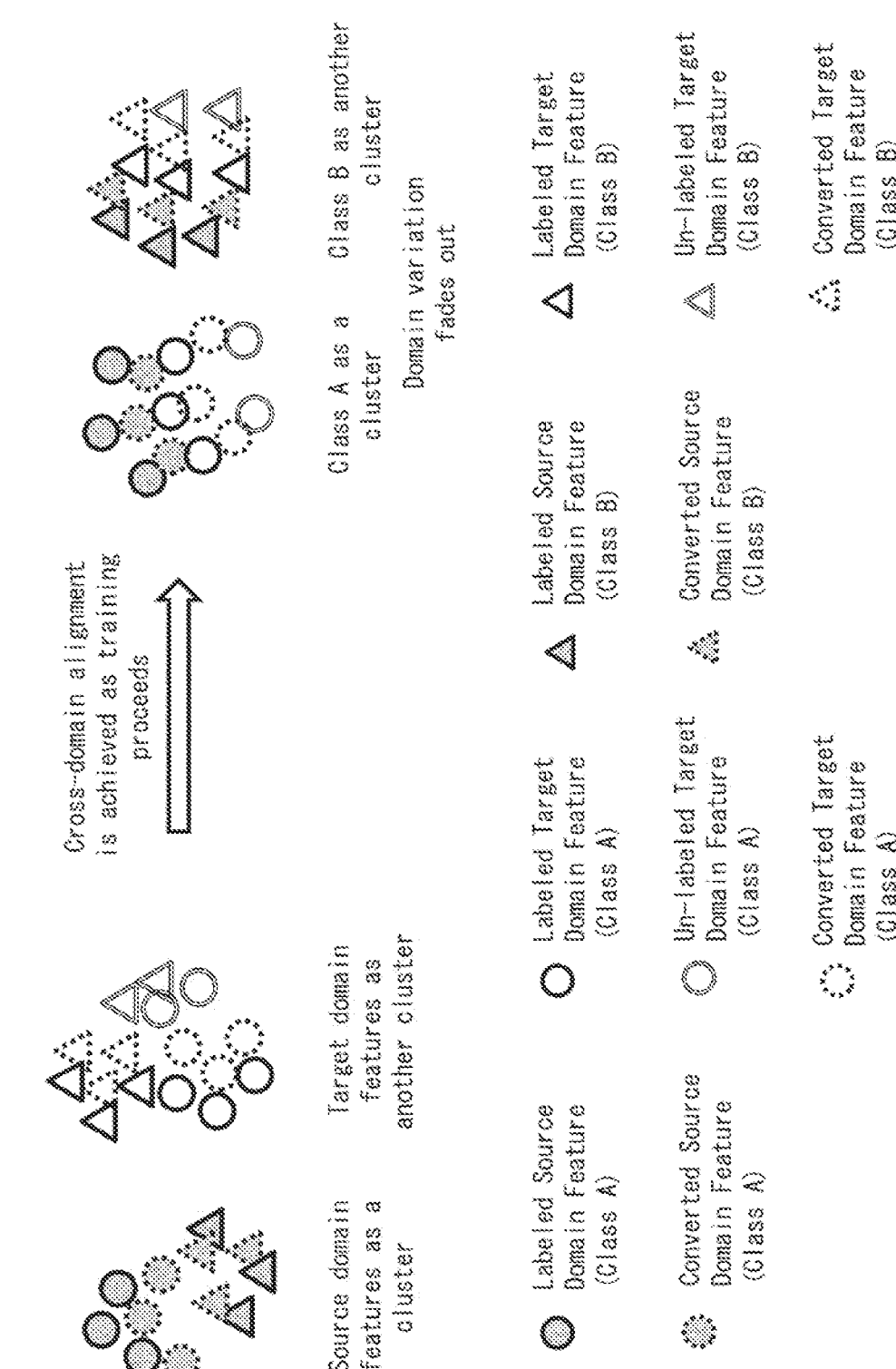
FIG. 9 is diagram schematically showing a cross domain alignment achieved in the second example embodiment.

FIG. 9 schematically shows a cross domain alignment achieved by the second example embodiment. In the training apparatus 10a, since the grouping loss is included in the merged loss, as the training proceeds, source domain features and target domain features preferably overlap each other, while features belonging to different classes are preferably separated for each class in a feature space, as shown in FIG. 9.

In other words, according to the second example embodiment, a cross domain alignment in a feature space is appropriately achieved.

As a result, the second feature extraction section 11b and the second class prediction section 12b are appropriately trained even in a case where a small amount of target domain labeled data is available.

Furthermore, according to the second example embodiment, as mentioned above, the first angle conversion section 12a generates converted source domain feature values X s by converting the source domain feature values $X^S$ as if the converted source domain feature values $X'^S$ are extracted from source domain image data having different angles from the input source domain image data $I^S$. The second angle conversion section 12b also generates converted target domain feature values $X'^T$ by converting the target domain feature values $X^T$ as if the converted target domain feature values $X'^T$ are extracted from target domain image data having different angles from the input target domain image data $I^T$. Then, the converted source domain feature values $X'^S$ and the converted target domain feature values $X'^T$ are referred to by the first class prediction section 13a and the second class prediction section 13b, respectively.

Therefore, according to the second example embodiment, the first class prediction section 13a and the second class prediction section 13b can be trained such that the first class prediction section 13a and the second class prediction section 13b can provide an appropriate class prediction for various shooting angles.

More particularly, the second class prediction section 13b can be trained such that the second class prediction section 13b can provide an appropriate class prediction for unlabeled input image data having a shooting angle different from that of training image data.

In other words, according to the second example embodiment, the training apparatus 10a provides an efficient training process in a case where training images having a limited variation of shooting angles are available.

(Training Method by Training Apparatus)

Figure 10:
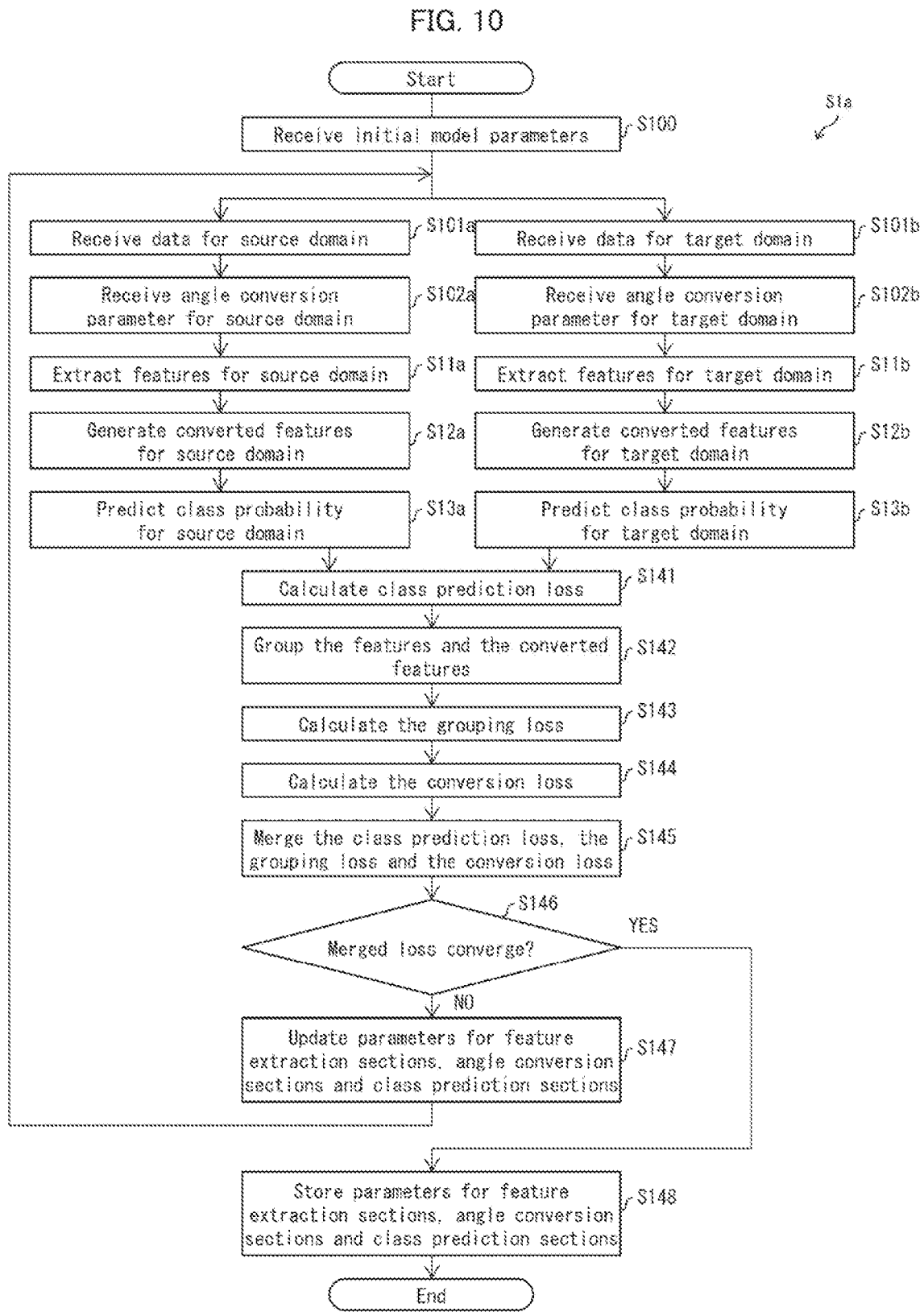
FIG. 10 is a flowchart showing a flow of a training method according to the second example embodiment.

The following description will discuss a training method carried out by the training apparatus 10a according to the second example embodiment, with reference to FIG. 10. FIG. 10 is a flowchart showing a flow of a training method S1a carried out by the training apparatus 10a.

(Step S100)

In the step S100, the training apparatus 10a receives initial model parameters. The initial model parameters include initial model parameters for the first feature extraction section 11a, the second feature extraction section 11b, the first angle conversion section 12a, the second angle conversion section 12b, the first class prediction section 13a, and the second class prediction section 13b. The initial model parameters received in this step are supplied to the first feature extraction section 11a, the second feature extraction section 11$b$, the first angle conversion section 12$a$, the second angle conversion section 12$b$, the first class prediction section 13$a$, and the second class prediction section 13$b$.
(Step S101$a$)

In the step S101$a$, the training apparatus 10$a$ receives input source domain data. More specifically, the training apparatus 10$a$ receives source domain image data $I^S$ and source domain class label data $Y^S$ associated with the image data $I^S$.
(Step S101$b$)

In the step S101$b$, the training apparatus 10$a$ receives input target domain data. More specifically, the training apparatus 10$a$ receives target domain image data $I^T$ and target domain class label data $Y^T$ associated with the image data $I^T$.
(Step S102$a$)

In the step S102$a$, the first angle conversion section 12$a$ receives source domain angle conversion parameters (U.
(Step S102$b$)

In the step S102$b$, the second angle conversion section 12$b$ receives target domain angle conversion parameters $\Theta^T$.
(Step S11$a$)

In the step S11$a$, the first feature extraction section 11$a$ extracts feature values $X^S$ from source domain image data $I^S$. A specific process carried out by the first feature extraction section 11$a$ is described above and is therefore not repeatedly described here.
(Step S11$b$)

In the step S11$b$, the second feature extraction section 11$b$ extracts feature values $X^T$ from target domain image data $I^T$. A specific process carried out by the second feature extraction section 11$b$ is described above and is therefore not repeatedly described here.
(Step S12$a$)

In the step S12$a$, the first angle conversion section 12$a$ generates converted source domain feature values $X'^S$ by converting the source domain feature values $X^S$ as if the converted source domain feature values $X'^S$ are extracted from source domain image data having different angles from the input source domain image data $I^S$. A specific process carried out by the first angle conversion section 12$a$ is described above and is therefore not repeatedly described here.
(Step S12$b$)

In the step S12$b$, the second angle conversion section 12$b$ generates converted target domain feature values $X'^T$ by converting the target domain feature values $X^T$ as if the converted target domain feature values $X'^T$ are extracted from target domain image data having different angles from the input target domain image data $I^T$. A specific process carried out by the second angle conversion section 12$b$ is described above and is therefore not repeatedly described here.
(Step S13$a$)

In the step S13$a$, the first class prediction section 13$a$ predicts source domain class prediction values $P^S$ from the source domain feature values $X^S$ and source domain class prediction values of the converted source domain feature values $CP^S$ from the converted source domain feature values $X'^S$. A specific process carried out by the first class prediction section 13$a$ is described above and is therefore not repeatedly described here.
(Step S13$b$)

In the step S13$b$, the second class prediction section 13$b$ predicts target domain class prediction values $P^T$ from the target domain feature values $X^T$ and target domain class prediction values of the converted target domain feature values $CP^T$ from the converted target domain feature values $X'^T$. A specific process carried out by the second class prediction section 13$b$ is described above and is therefore not repeatedly described here.
(Step S141)

In the step S141, the classification loss computation section 141 computes a source domain classification loss (Loss_classification_S) with reference to the source domain class prediction values $P^S$, the source domain class prediction values of the converted source domain feature values $CP^S$ and source domain class label data $Y^S$. The classification loss computation section 141 also computes a target domain classification loss (Loss_classification_T) with reference to the target domain class prediction values $P^T$, the target domain class prediction values of the converted target domain feature values $CP^T$ and target domain class label data $Y^T$. A specific process carried out by the classification loss computation section 141 is described above and is therefore not repeatedly described here.
(Step S142)

In the step S142, the grouping section 142 generates and outputs, from the source domain feature values $X^S$, the converted source domain feature values $X'^S$, the target domain feature values $X^T$, and the converted target domain feature values $X'^T$, class groups where each class group contains feature values sharing the same class label. A specific process carried out by the grouping section 142 is described above and is therefore not repeatedly described here.
(Step S143)

In the step S143, the grouping loss computation section 143 computes the grouping loss (Loss_grouping) with reference to the class groups generated by the grouping section 142. A specific process carried out by the grouping loss computation section 143 is described above and is therefore not repeatedly described here.
(Step S144)

In the step S144, the conversion loss computation section 144 computes a conversion loss with reference to the source domain feature values $X^S$, the converted source domain feature values $X'^S$, the target domain feature values $X^T$, and the converted target domain feature values $X'^T$. A specific process carried out by the conversion loss computation section 144 is described above and is therefore not repeatedly described here.
(Step S145)

In the step S145, the merged loss computation section 145 computes a merged loss (Loss_merge) with reference to the source domain classification loss (Loss_classification_S), the target domain classification loss (Loss_classification_T), the grouping loss (Loss_grouping), and the conversion loss (Loss_conversion). A specific process carried out by the merged loss computation section 145 is described above and is therefore not repeatedly described here.
(Step S146)

In the step S146, the model updating section 146 determines whether the merged loss is converged or not. If the merged loss is converged (YES in the step S146), the process proceeds to the step S148. If the merged loss is not converged (NO in the step S146), the process proceeds to the step S147.
(Step S147)

In the step S147, the model updating section 146 updates model parameters for the first feature extraction section 11$a$, the second feature extraction section 11$b$, the first angle conversion section 12$a$, the second angle conversion section 12$b$, the first class prediction section 13$a$, and the second class prediction section 13b, with reference to the merged loss computed by the merged loss computation section 145.
(Step S148)

In the step S148, the model updating section 146 stores, in a storage medium, the model parameters for the first feature extraction section 11a, the second feature extraction section 11b, the first angle conversion section 12a, the second angle conversion section 12b, the first class prediction section 13a, and the second class prediction section 13b, with reference to the merged loss computed by the merged loss computation section 145.

Note that the order of the steps in the training method S1a does not limit the second example embodiment. For example, in the training method S1a, the steps S141, (S142, S143), and S144 can be carried out in any order.
(Advantageous Effect)

The training method S1a carried out by the training apparatus 10a explained above provides an efficient training process in a case where training images having a limited variation of shooting angles are available.
(Configuration of Classification Apparatus)

Figure 11:
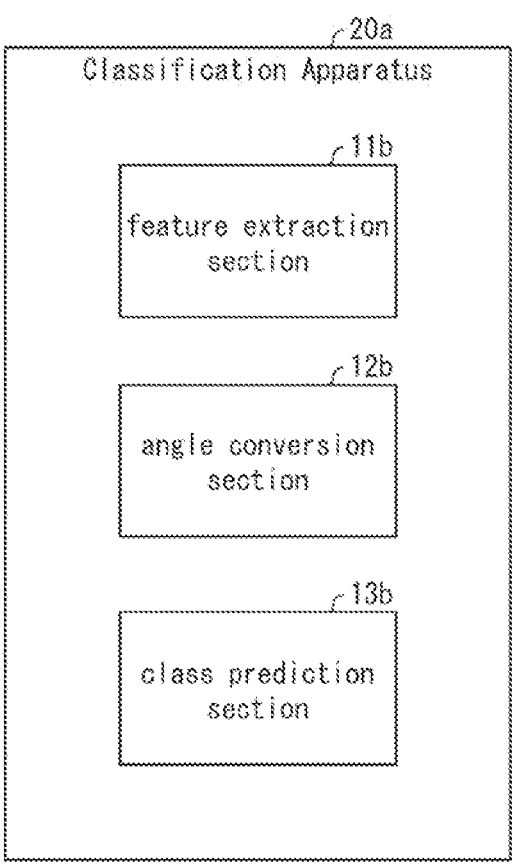
FIG. 11 is a block diagram illustrating a configuration of the classification apparatus according to the second example embodiment.

The following description will discuss a configuration of the classification apparatus 20a according to the second example embodiment with reference to FIG. 11. FIG. 11 is a block diagram illustrating a configuration of the classification apparatus 20a. As illustrated in FIG. 11, the classification apparatus 20a includes a feature extraction section 11b, an angle conversion section 12b, and a class prediction section 13b. Here, the feature extraction section 11b is configured in a manner similar to that of the above described second feature extraction section 11b, the angle conversion section 12b is configured in a manner similar to that of the above described second angle conversion section 12b, and the class prediction section 13b is configured in a manner similar to that of the above described second class prediction section 13b.

According to the classification apparatus 20a, the angle conversion section 12b generates converted feature values by converting the feature values extracted by the feature extraction section 11b as if the converted feature values are extracted from image data having different angles from the input image data.

Therefore, the classification apparatus according to the second example embodiment provides appropriate class predictions for input images having various shooting angles, even in a case where training images having a limited variation of shooting angles are available.

More specifically, as an example, the classification apparatus 20a may comprise a user input receiving section as explained in the first example embodiment. In this configuration, the user can choose to use or NOT use the angle conversion section 12b in classification apparatus 20a. If NOT use the angle conversion section 12b, the feature values provided by the feature extraction section 11b goes directly to the class prediction section 13b (and accurate prediction can still be made since the class prediction section has be trained with the classification loss which also compares the values between $CP^S$ for converted unseen angle features and $Y^S$. In other words, the prediction section has been trained to see unseen input data by trained with converted features. Here, 'unseen' means that testing set's angles are different from the training set). If USE the angle conversion section, an example of usage is that the user gives an angle conversion parameter which represents a rotation of +0 degree, in which way the user now can obtain 2 predictions of the same input testing image, one is predicted from the original feature directly extracted from the image, the other is predicted from the converted feature which is generated by rotating the original feature by 0 degree. Now the user can make a better decision based on 2 predictions, so let's say there are 2 classes, and the prediction from the original feature says that it has 0.4 confidence that the feature belongs to class 0 and 0.6 confidence that belongs to class 1, and the prediction from the converted features say that it has 0.8 confident that the feature belongs to class 0, and 0.2 confidence that belongs to class 1 (in this specific example, original feature and converted feature disagree with each other on the class label). The highest confidence is given by the prediction from the converted feature (which is 0.8 that it belongs to class 0), thus the prediction section will attach label 0 to this testing image. By using the angle conversion section 12b, the user can get extra features, make extra predictions to assist in making the final decision. Note that the user may give more than one conversion parameters, such as [+0, +20, −10, etc.] and obtain multiple predictions of converted features. Also, how the final decision is made can vary. In this above example, the class label of the highest confidence is selected as the final output. The user may take a summation of all confidences and output the highest one. For instance, the prediction for the original feature is [0.4, 0.6], and that for the converted feature is [0.8, 0.2]. by taking sum, the total confidence is [1.2, 0.8], class 0 receives higher total confidence score, thus the output will be label 0.

Remarks on Second Example Embodiment (Remark 1: On Feature Extraction Section)

In an exemplary configuration, the first feature extraction section 11a and the second feature extraction section 11b may be completely independent from each other. In other words, the first feature extraction section 11a and the second feature extraction section 11b share neither model parameters nor layers.

In another exemplary configuration, the first feature extraction section 11a and the second feature extraction section 11b may share one or some of the model parameters. In other words, the first feature extraction section 11a and the second feature extraction section 11b may share one or some of the layers.

For example, the first feature extraction section 11a and the second feature extraction section 11b may share first several layers in which low-level features such as edges, corners, etc. are extracted. Alternatively, the first feature extraction section 11a and the second feature extraction section 11b may share last several layers in which high-level features or abstract features such as semantic meanings, etc. are extracted.

In yet another exemplary configuration, the first feature extraction section 11a and the second feature extraction section 11b may share all of the model parameters. In other words, the first feature extraction section 11a and the second feature extraction section 11b may share all the layers.
(Remark 2: On Class Prediction Section)

In an exemplary configuration, the first class prediction section 13a and the second class prediction section 13b may be completely independent from each other. In other words, the first class prediction section 13a and the second class prediction section 13b share neither model parameters nor layers.

In another exemplary configuration, the first class prediction section 13a and the second class prediction section 13b may share one or some of the model parameters. In other words, the first class prediction section 13*a* and the second class prediction section 13*b* may share one or some of the layers.

In yet another exemplary configuration, the first class prediction section 13*a* and the second class prediction section 13*b* may share all of the model parameters. In other words, the first class prediction section 13*a* and the second class prediction section 13*b* may share all the layers.

(Remark 3: On Angle Conversion Section)

In an exemplary configuration, the first angle conversion 12*a* and the second angle conversion section 12*b* may be completely independent from each other. In other words, the first angle conversion 12*a* and the second angle conversion section 12*b* share neither model parameters nor layers.

In another exemplary configuration, the first angle conversion 12*a* and the second angle conversion section 12*b* may share one or some of the model parameters. In other words, the first angle conversion 12*a* and the second angle conversion section 12*b* may share one or some of the model parameters or of the layers.

In yet another exemplary configuration, the first angle conversion 12*a* and the second angle conversion section 12*b* may share all of the model parameters. In other words, the first angle conversion 12*a* and the second angle conversion section 12*b* may share all of the layers.

Figure 12:
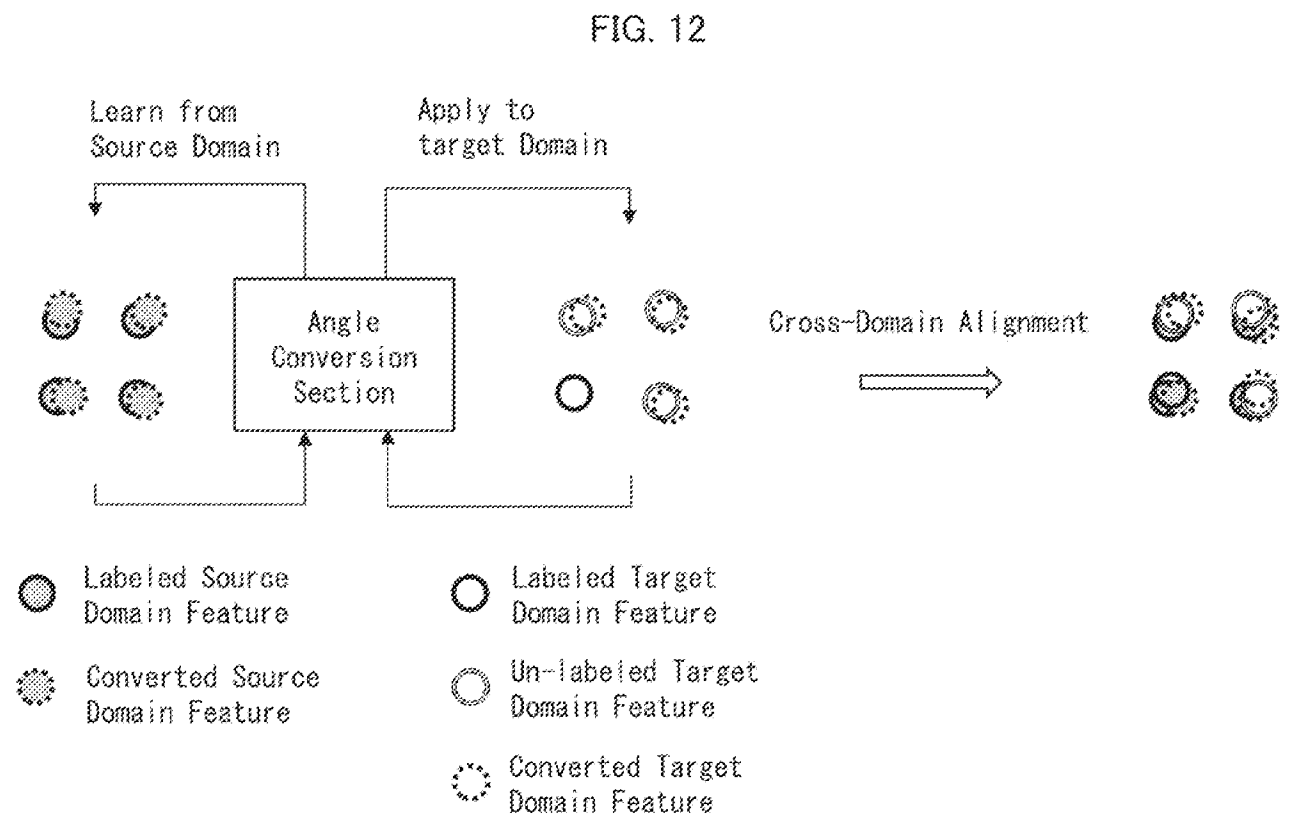

FIG. 12 schematically shows an advantageous effect of the configuration in which the first angle conversion 12*a* and the second angle conversion section 12*b* share at least one or some of the model parameters.

In this configuration, the first angle conversion 12*a* and the second angle conversion section 12*b* may be trained using labeled source domain data, and the second angle conversion section 12*b* applies, to the target domain, knowledge learnt from the source domain. Therefore, according to this configuration, the second angle conversion section 12*b* can be trained more efficiently as compared with a case where the first angle conversion 12*a* and the second angle conversion section 12*b* are completely independent from each other.

(Remark 4: On Grouping Loss)

Computation of the grouping loss may be achieved by any method for computing the distance or similarity between two features in the class groups. The grouping loss may be L1 norm, L2 norm, cosine similarity, or even some other measure which requires learning, etc.

Moreover, in an exemplary configuration, after computing the grouping loss, the grouping loss computation section 143 may carry out some post-processing manipulation such as rescaling on the grouping loss so that the grouping loss is resealed within a safer range, such as within [0,1). As a specific example, the grouping loss computation section 143 may compute a post-processed grouping loss (Loss_grouping_pp) by rescaling the grouping loss (Loss_grouping) as follows.

[Math. 17]

$$\text{Loss}_{grouping-pp} =$$
$$\frac{1}{n}\sum\nolimits_{x\in(X^S\cup X'^S\cup X^T\cup X'^T)} 1 - e^{-max(dist_{max-intra} -dist_{min-inter} +margin,0)}$$

(Eq. 17)

The rescaling is carried out in view of the following problem. That is, even in a case of high quality features, a distance, based on which the loss is computed, can still be very large, and this results in a large loss. There are different ways to rescale the grouping loss within a safe range, such as a simple clipping (If Loss_grouping >1, return 1; else return Loss_grouping); or a simple linear reweighting with a weight λ (λLoss_grouping); or any more complex formula.

Note that the above expression of the grouping loss may not limit the second example embodiment. For example, the grouping loss may be obtained separately for the real features and the converted features. Here, by 'real' we refer to the grouping loss computed with reference to real feature values which do not go through the angle conversion sections 12*a* and 12*b* and by 'converted' we refer to the grouping loss computed with reference to converted feature values which are produced by the angle conversion sections 12*a* and 12*b* by taking real feature values as the input.

In other words, the grouping loss computation section 143 may compute a grouping loss for the real features based on features from a union of $X^S$ and $X^T$ (only involving real features) and may compute another grouping loss for the converted features based on features from a union of $X'^S$ and $X'^T$ (only involving converted feature).

Alternatively, the grouping loss may be computed after undesired features are filtered out based on certain conditions. The conditions can depend on the correctness of the predictions given by the first class prediction section 13*a* and the second class prediction section 13*b*, or on the confidence of the predictions given by the first class prediction section 13*a* and the second class prediction section 13*b*.

(Remark 5: On Merging Loss)

The merging loss can be a direct sum of all the subtask losses such as the source domain classification loss (Loss_classification_S), the target domain classification loss (Loss_classification_T), the conversion loss (Loss_conversion) and the grouping loss (Loss_grouping), or can be a weighted sum of the subtask losses.

The weight of sum may vary in accordance with the training progress (e.g., at early training iterations, the weight of classification loss is high, and then the weight decays as the number of trained iterations increases). The weight may also be a weight which requires learning.

Third Example Embodiment

The following description will discuss details of a third example embodiment of the present invention with reference to the drawings. Note that the same reference numerals are given to elements having the same functions as those described in the foregoing example embodiments, and descriptions of such elements are omitted as appropriate. Moreover, an overview of the third example embodiment is the same as the overview of the foregoing example embodiments, and is thus not described here.

(Configuration of Training Apparatus)

Figure 13:
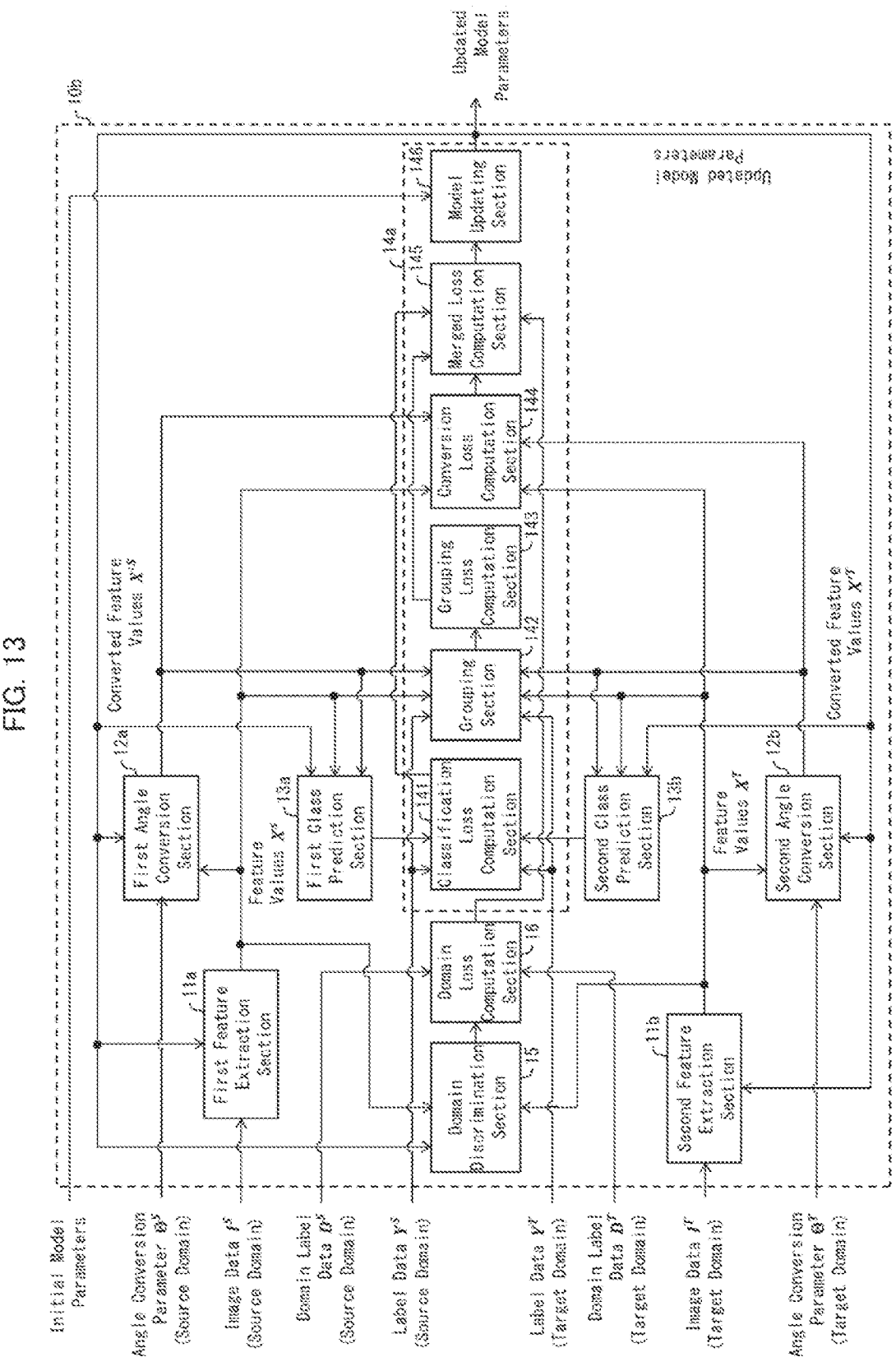
FIG. 13 is a block diagram illustrating a configuration of the training apparatus according to the third example embodiment.

The following description will discuss a configuration of a training apparatus 10*b* according to the third example embodiment with reference to FIG. 13. FIG. 13 is a block diagram illustrating a configuration of the training apparatus 10*b*. As illustrated in FIG. 13, the training apparatus 10*b* includes a domain discrimination section 15 and a domain loss computation section 16, in addition to the constituent elements included in the training apparatus 10*a* according to the second example embodiment.

(Domain Discrimination Section)

The domain discrimination section 15 carries out a discrimination process to discriminate the target domain from the source domain. In other words, the domain discrimination section 15 carries out domain prediction which indicates whether a feature is from the source domain or from the target domain.

For example, the domain discrimination section 15 carries out the following processes. The domain discrimination section 15 receives the source domain feature values $X^S$ extracted by the first feature extraction section 11a and the target domain feature values $X^T$ extracted by the second feature extraction section 11b. Then, the domain discrimination section 15 carries out a discrimination process to discriminate the source domain feature values X from the target domain feature values $X^T$ without referring to any information regarding which domain the feature belongs to. Then, the domain discrimination section 15 outputs a result of the discrimination process.

As a specific example, in a case where the feature values $X^S$ are given by Eq. 1, the domain discrimination section 15 may output the result $DP^S$ of the discrimination process for the feature values $X^S$ as follows.

[Math.18]

$$DP^S=[S,T,T,S] \tag{Eq.18}$$

Moreover, as a specific example, in a case where the feature values $X^{T1}$ are given by Eq. 2, the domain discrimination section 15 may output the result $DP^T$ of the discrimination process for the feature values $X^T$ as follows.

[Math.19]

$$DP^T=[T,T,T,S] \tag{Eq.19}$$

(Domain Loss Computation Section)

The domain loss computation section 16 computes and outputs a domain discrimination loss with reference to the result of the discrimination process carried out by the domain discrimination section 15. The domain discrimination loss may also simply be referred to as a domain loss.

For example, the domain loss computation section 16 receives (i) source domain label data $D^S$ which indicates ground truth domain labels for the source domain and (ii) target domain label data $D^T$ which indicates ground truth domain labels for the target domain. As a specific example, the source domain label data $D^S$ and the target domain label data $D^T$ may be expressed as follows.

[Math.20]

$$D^S=[S,S,S,S] \tag{Eq.20}$$

[Math.21]

$$D^T=[T,T,T,T] \tag{Eq.21}$$

The domain loss computation section 16 computes a domain loss according to (i) a degree of mismatch between $DP^S$ and $D^S$ and (ii) a degree of mismatch between $DP^T$ and $D^T$.

As a specific example, in a case where $DP^S$ is given by Eq. 18, $D^S$ is given by Eq. 20, $DP^T$ is given by Eq. 19, and $D^T$ is given by Eq. 21, the domain loss computation section 16 computes a domain loss (Loss_domain) as below, because two components in $DP^S$ are different from corresponding components in $D^S$, and one component in $DP^T$ is different from a corresponding component in $D^T$.

[Math.22]

$$Loss_{domain}=2+1=3 \tag{Eq. 22}$$

(Merged Loss Computation Section)

The merged loss computation section 145 according to the third example embodiment computes a merged loss (Loss_merge) with reference to the source domain classification loss (Loss_classification_S), the target domain classification loss (Loss_classification_T), the grouping loss (Loss_grouping), the conversion loss (Loss_conversion), and the domain loss (Loss_domain).

For example, the merged loss computation section 145 according to the third example embodiment computes a merged loss as follows.

[Math.23]

$$Loss_{merge}=\alpha Loss_{classification\ S}+\beta Loss_{classification\ T}+\gamma Loss_{grouping}+\delta Loss_{conversion}-\tau Loss_{domain} \tag{Eq. 23}$$

Here, the coefficients $\alpha$, $\beta$, $\gamma$, $\delta$, and $\tau$ indicate weight coefficients whose specific values do not limit the third example embodiment. Note that the sign in front of the domain loss is minus. This means that the model updating section 146 updates the model parameters for the first feature extraction section 11a and the second feature extraction section 11b such that the extracted features may cause a discrimination result by the domain discrimination section 15 to become less accurate. In other words, the model updating section 146 updates the model parameters for the first feature extraction section 11a and the second feature extraction section 11b such that the extracted features may confuse the domain discrimination section 15. Note here that the model updating section 146 may also update the domain discrimination section 15 with reference to the merged loss explained above.

(Training by the Training Apparatus)

From the viewpoint of training, the training apparatus 10b carries out the following processes. First, the training apparatus 10b trains the domain discrimination section 15 so that the domain discrimination section 15 can tell whether a feature is from a source domain or from a target domain. Second, the training apparatus 10b trains the first feature extraction section 11a and the second feature extraction section 11b to extract features that can confuse the trained domain discrimination section 15.

By iterating the above processes, the training apparatus 10b may achieve a situation in which the well-trained domain discrimination section 15 cannot tell whether a feature is from the source domain or from the target domain. This means that the feature has a very good domain confusion property, or in other words, a domain invariant property.

Figure 14:
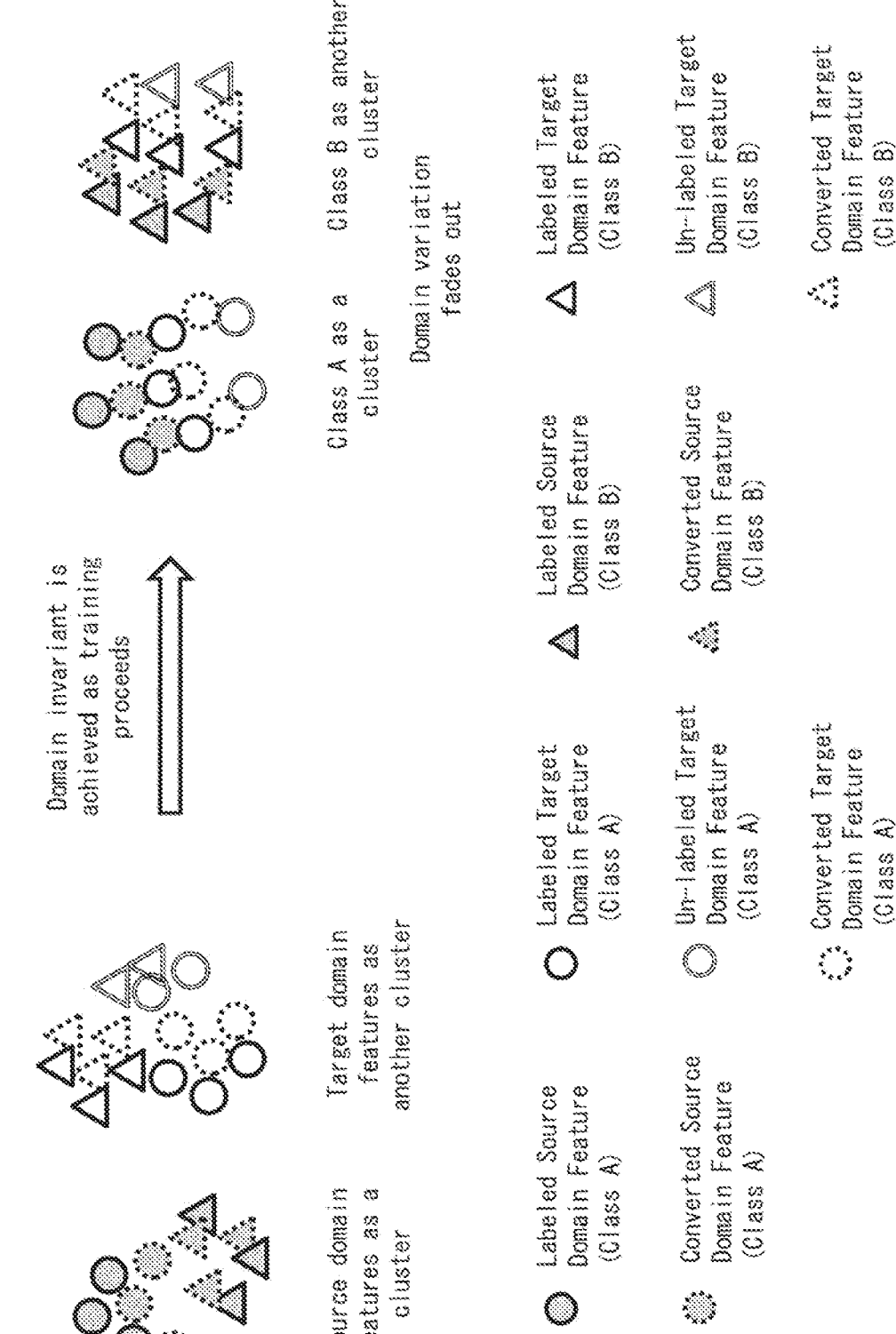
FIG. 14 is a block diagram schematically illustrating a domain invariant property in the third example embodiment.

FIG. 14 is a diagram schematically illustrating a process in which the first feature extraction section 11a and the second feature extraction section 11b achieve the domain invariant property by the training carried out by the training apparatus 10b. As seen in FIG. 14, features which separately exist in the feature space at an early stage of training do not separately exist in the feature space at a later stage of training. As such, the domain invariant property is achieved by the training which is carried out by the training apparatus 10b.

(Advantageous Effect)

According to the third example embodiment, as explained above, the training apparatus 10b may achieve the domain invariant property of the extracted features $X^S$ and $X^T$. This leads to a preferable target domain property.

Therefore, according to the third example embodiment, the training apparatus 10b provides an efficient and stable training process even in a case where a small amount of target domain labeled data is available.

(Training Method by Training Apparatus)

The following description will discuss a training method carried out by the training apparatus 10b according to the third example embodiment with reference to FIG. 15. FIG. 15 is a flowchart showing a flow of a training method S1b carried out by the training apparatus 10b.

As shown in FIG. 15, the training method S1*b* according to the third example embodiment further includes a step S15 and a step S16, in addition to the steps included in the training method S1*a* according to the second example embodiment. In the following descriptions, only differences between the training method S1*b* according to the third example embodiment and the training method S1*a* according to the second example embodiment will be described.

(Step S15)

In the step S15, the domain discrimination section 15 carries out a domain discrimination process to discriminate the target domain from the source domain. A specific process carried out by the domain discrimination section 15 is described above and is therefore not repeatedly described here.

(Step S16)

In the step S16, the domain loss computation section 16 computes and outputs a domain discrimination loss with reference to the result of the discrimination process carried out by the domain discrimination section 15. A specific process carried out by the domain loss computation section 16 is described above and is therefore not repeatedly described here.

(Step S145)

In the step S145, the merged loss computation section 145 according to the third example embodiment computes a merged loss (Loss_merge) with reference to (i) the source domain classification loss (Loss_classification_S), (ii) the target domain classification loss (Loss_classification_T), (iii) the grouping loss (Loss_grouping), (iv) the conversion loss (Loss_conversion), and (v) the domain loss (Loss_domain). A specific process carried out by the merged loss computation section 145 is described above and is therefore not repeatedly described here.

Note that the order of the steps in the training method S1*b* does not limit the third example embodiment. For example, in the training method Sib, the steps S141, (S142, S143), and S144 can be carried out in any order.

(Advantageous Effect)

According to the third example embodiment, the training method S1*b* provides an efficient and stable training process even in a case where a small amount of target domain labeled data is available.

(Configuration of Classification Apparatus)

The following description will discuss a configuration of a classification apparatus according to the third example embodiment. The classification apparatus 20*a* according to the third example embodiment has a configuration similar to that of the classification apparatus 20*a* illustrated in FIG. 11.

According to the third example embodiment, the training apparatus 10*b* achieves the domain invariant property of the extracted features $X^S$ and $X^T$. This leads to a preferable target domain property also in the classification apparatus according to the third example embodiment.

Therefore, the classification apparatus 20*a* according to the third example embodiment provides a preferable classification process even in a case where a small amount of target domain labeled data is available.

Remarks on Third Example Embodiment

To compute the domain loss, class labels are not needed. Thus, instead of using only labeled target domain data, the training apparatus 10*b* can also use unlabeled (in a sense of class label) target data. As long as the data is from a target dataset, the training apparatus 10*b* may know that a domain label of the data is TARGET.

By including unlabeled (in a sense of class label) target data, the above mentioned domain-invariant features can be more generalized. The features may be not only domain-invariant relative to all pieces of the labeled data, but also domain-invariant relative to all pieces of unlabeled target data.

The above configuration using unlabeled (in a sense of class label) target data may suitably achieve the domain invariant property in a situation in which a limited amount of class labeled target data is available.

Fourth Example Embodiment

The following description will discuss details of a fourth example embodiment of the present invention with reference to the drawings. Note that the same reference numerals are given to elements having the same functions as those described in the foregoing example embodiments, and descriptions of such elements are omitted as appropriate. Moreover, an overview of the fourth example embodiment is the same as the overview of the foregoing example embodiments, and is thus not described here.

(Configuration of Training Apparatus)

Figure 16:
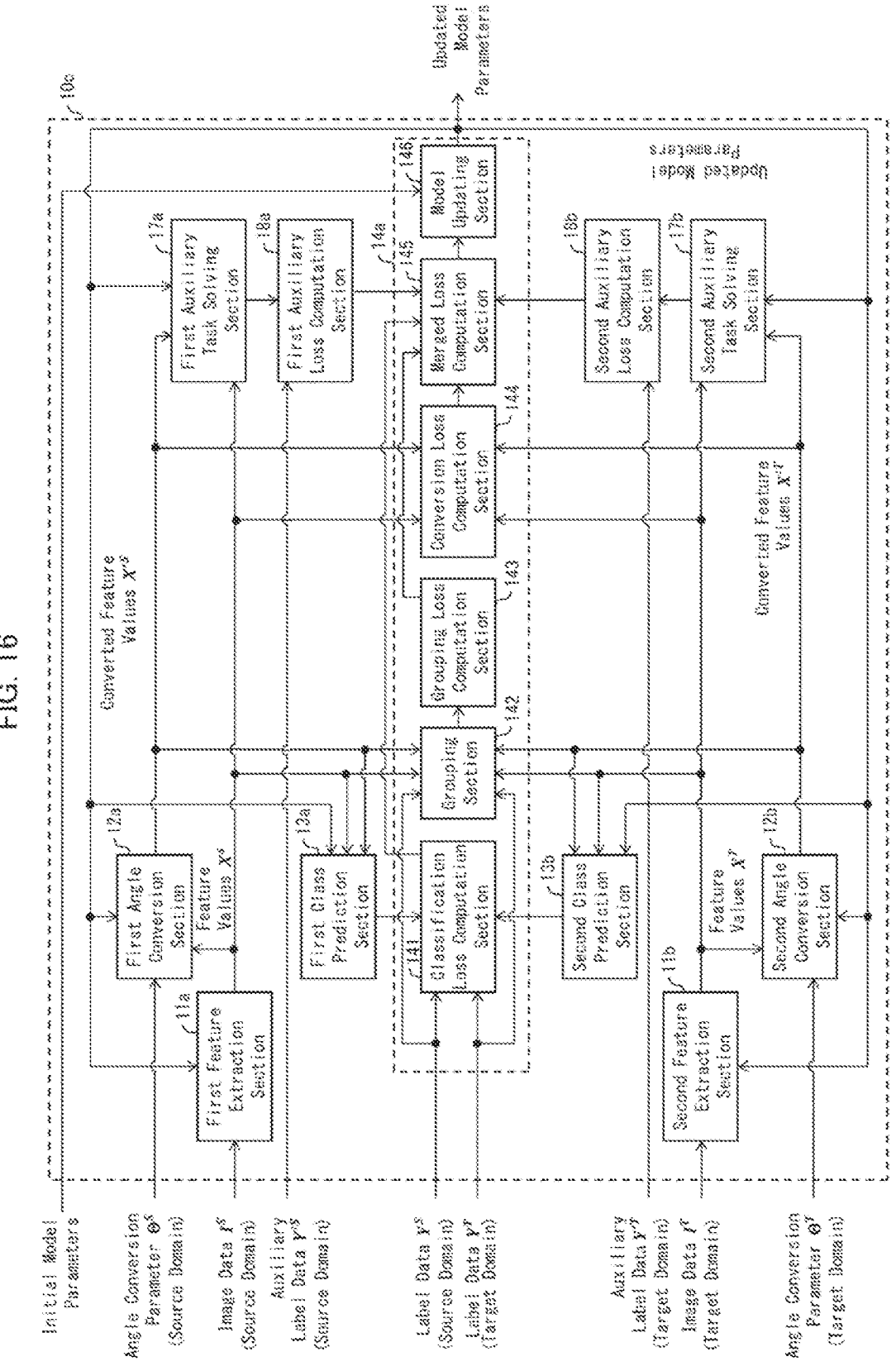
FIG. 16 is a block diagram illustrating a configuration of the training apparatus according to the fourth example embodiment.

The following description will discuss a configuration of a training apparatus 10*c* according to the fourth example embodiment with reference to FIG. 16. FIG. 16 is a block diagram illustrating a configuration of the training apparatus 10*c*. As illustrated in FIG. 16, the training apparatus 10*c* includes a first auxiliary task solving section 17*a*, a second auxiliary task solving section 17*b*, a first auxiliary loss computation section 18*a*, and a second auxiliary loss computation section 18*b*, in addition to the constituent elements included in the training apparatus 10*a* according to the second example embodiment.

The first auxiliary task solving section 17*a* and the second auxiliary task solving section 17*b* can be configured as a single section. The first auxiliary loss computation section 18*a* and the second auxiliary loss computation section 18*b* can be configured as a single section.

The first auxiliary task solving section 17*a*, the second auxiliary task solving section 17*b*, the first auxiliary loss computation section 18*a*, and the second auxiliary loss computation section 18*b* have exemplary configurations described below.

First Exemplary Configuration

In a first exemplary configuration, the first auxiliary task solving section 17*a* and the second auxiliary task solving section 17*b* are examples of the one or more angle prediction means recited in claims. The first auxiliary loss computation section 18*a* and the second auxiliary loss computation section 18*b* are examples of the one or more angle prediction loss computation means recited in claims.

The first auxiliary task solving section 17*a* predicts source domain angle prediction values from the source domain feature values $X^S$ and the converted source domain feature values $X'^S$.

As a specific example, 0-359 degrees are divided into a plurality of bins. For example, 0-359 degrees may be divided into 36 bins (10 degrees are regarded as 1 bin). If an image has an angle of 5 degrees, the image falls into the 1st bin. If an image has an angle of 247 degrees, the image falls into the 25th bin ((247/10)+1).

More specifically, it is possible to take an example where the source domain image data $I^S$ and the source domain angle conversion parameter $\Theta^S$ are given as follows.

[Math.24]

$$X^S = [\text{Image at } 5°, \text{Image at } 247°] \tag{Eq.24}$$

[Math.25]

$$\Theta^S = +30° \tag{Eq.25}$$

As a specific example, the first auxiliary task solving section 17a may predict, from the source domain feature values $X^S$ and the converted source domain feature values $X'^S$, source domain angle prediction values $P'^S$ as follows.

[Math.26]

$$P'^S = [1,25,4,29] \tag{Eq.26}$$

Note here that the source domain angle prediction values $P'^S$ include wrongly predicted values because the 4th component should be 28 if the prediction is correctly performed.

The first auxiliary loss computation section 18a outputs a source domain angle prediction loss with reference to the source domain angle prediction values $P'^S$. The first auxiliary loss computation section 18a may also refer to source domain auxiliary label data $Y'^S$ when outputting the source domain angle prediction loss.

More specifically, the first auxiliary loss computation section 18a may refer to source domain auxiliary label data $Y'^S$ which is ground truth label data. As a specific example, the source domain auxiliary label data $Y'^S$ may be given as follows.

[Math.27]

$$Y'^S = [1,25,4,28] \tag{Eq.27}$$

In a case where the source domain angle prediction values $P'^S$ are given by Eq. 26 and the source domain auxiliary label data $Y'^S$ is given by Eq. 27, the first auxiliary loss computation section 18a outputs a source domain angle prediction loss (Loss_angle_prediction_S) as follows.

[Math.28]

$$\text{Loss}_{angle\ prediction\ S} = 1 \tag{Eq.28}$$

In a similar manner, the second auxiliary task solving section 17b predicts target domain angle prediction values from the target domain feature values $X^T$ and the converted target domain feature values $X'^T$.

The second auxiliary loss computation section 18b outputs a target domain angle prediction loss (Loss_angle_prediction_T) with reference to the target domain angle prediction values $P'^T$. The second auxiliary loss computation section 18b may also refer to the target domain angle label data when outputting the target domain angle prediction loss.

The merged loss computation section 145 may compute a merged loss (Loss_merge) with reference to at least one of the source domain classification loss (Loss_classification_S), the target domain classification loss (Loss_classification_T), the grouping loss (Loss_grouping), the conversion loss (Loss_conversion), the source domain angle prediction loss (Loss_angle_prediction_S), and the target domain angle prediction loss (Loss_angle_prediction_T).

For example, the merged loss computation section 145 may compute a merged loss as follows.

[Math.29]

$$\text{Loss}_{merge} = \alpha \text{Loss}_{classification\ S} + \beta \text{Loss}_{classification\ T} + \gamma \text{Loss}_{grouping} + \delta \text{Loss}_{conversion} + \eta \text{Loss}_{angle\ prediction\ S} + \xi \text{Loss}_{angle\ prediction\ T} \tag{Eq. 29}$$

Here, the coefficients $\alpha$, $\beta$, $\gamma$, $\delta$, $\eta$, and $\xi$ indicate weight coefficients whose specific values do not limit the fourth example embodiment. Note that in this first exemplary configuration, the model updating section 146 may also update the first auxiliary updating section 17a (angle prediction means) and the second auxiliary updating section 17b (angle prediction means) with reference to the merged loss explained above.

(Advantageous Effect)

Without the first auxiliary task solving section 17a, the second auxiliary task solving section 17b, the first auxiliary loss computation section 18a, and the second auxiliary loss computation section 18b, the training apparatus may cause the following situation.

Instead of learning correct conversion functions, the first angle conversion section 12a may force the first feature extraction section 11a to provide angle-invariant features, so that the first angle conversion section 12a may learn an identity mapping only. Furthermore, instead of learning correct conversion functions, the second angle conversion section 12b may force the second feature extraction section 11b to provide angle-invariant features, so that the second angle conversion section 12b may learn an identity mapping only.

The above situation is not desirable, because the situation may weaken the merit of the first angle conversion section 12a and the second angle conversion section 12b. This may cause predictions given by the first class prediction section 13a and the second class prediction section 13b to become less accurate.

According to the first exemplary configuration, the first auxiliary task solving section 17a and the second auxiliary task solving section 17b may ensure appropriate angle conversions by the first angle conversion section 12a and the second angle conversion section 12b, respectively. This ensures accuracy of the predictions given by the first class prediction section 13a and the second class prediction section 13b.

Second Exemplary Configuration

The second exemplary configuration may be arranged such that the first auxiliary task solving section 17a may output source domain angle prediction values as sine and cosine values.

More specifically, in a case where the source domain image data $I^S$ and the source domain angle conversion parameter $\Theta^S$ are given by Eq. 24 and Eq. 25, respectively, the first auxiliary task solving section 17a may predict, from the source domain feature values $X^S$ and the converted source domain feature values $X'^S$, source domain angle prediction values $P'^S$ as follows.

[Math.30]

$$P'^S = [0.08,0.99,-0.92,-0.39,057,0.81,-0.99,0.12] \tag{Eq. 30}$$

As a specific example, the source domain auxiliary label data $Y'^S$ may be given correspondingly as follows.

[Math.31]

$$Y'^S = [5°,247°,35°,277°] \tag{Eq. 31}$$

In a case where the source domain angle prediction values $P'^S$ are given by Eq. 30 and the source domain auxiliary label data $Y'^S$ is given by Eq. 31, the first auxiliary loss computation section 18a may output a source domain angle prediction loss (Loss_angle_prediction_S) as follows.

[Math. 32]

$$\mathrm{Loss}_{angle\ prediction\ S} = \left[ \left| \sin\left(\frac{5}{180}\pi\right) - 0.08 \right| + \right.$$
$$\left| \cos\left(\frac{5}{180}\pi\right) - 0.99 \right| + \left| \sin\left(\frac{247}{180}\pi\right) - -0.92 \right| +$$
$$\left| \cos\left(\frac{247}{180}\pi\right) - -0.39 \right| + \left| \sin\left(\frac{35}{180}\pi\right) - 0.57 \right| +$$
$$\left. \left| \cos\left(\frac{35}{180}\pi\right) - 0.81 \right| + \left| \sin\left(\frac{277}{180}\pi\right) - -0.99 \right| + \left| \cos\left(\frac{277}{180}\pi\right) - 0.12 \right| \right]$$

(Eq. 32)

A similar configuration may apply to the second auxiliary task solving section 17b and the second auxiliary loss computation section 18b.

According to the second exemplary configuration, the first auxiliary task solving section 17a and the second auxiliary task solving section 17b may ensure appropriate angle conversions by the first angle conversion section 12a and the second angle conversion section 12b, respectively. This ensures accuracy of the predictions given by the first class prediction section 13a and the second class prediction section 13b.

Third Exemplary Configuration

In a third exemplary configuration, the first auxiliary task solving section 17a and the second auxiliary task solving section 17b are examples of the one or more image reconstruction means recited in claims. The first auxiliary loss computation section 18a and the second auxiliary loss computation section 18b are examples of the one or more reconstruction loss computation means recited in claims.

The first auxiliary task solving section 17a may generate source domain reconstructed images from the source domain feature values $X^S$ and the converted source domain feature values $X'^S$.

Figure 17:
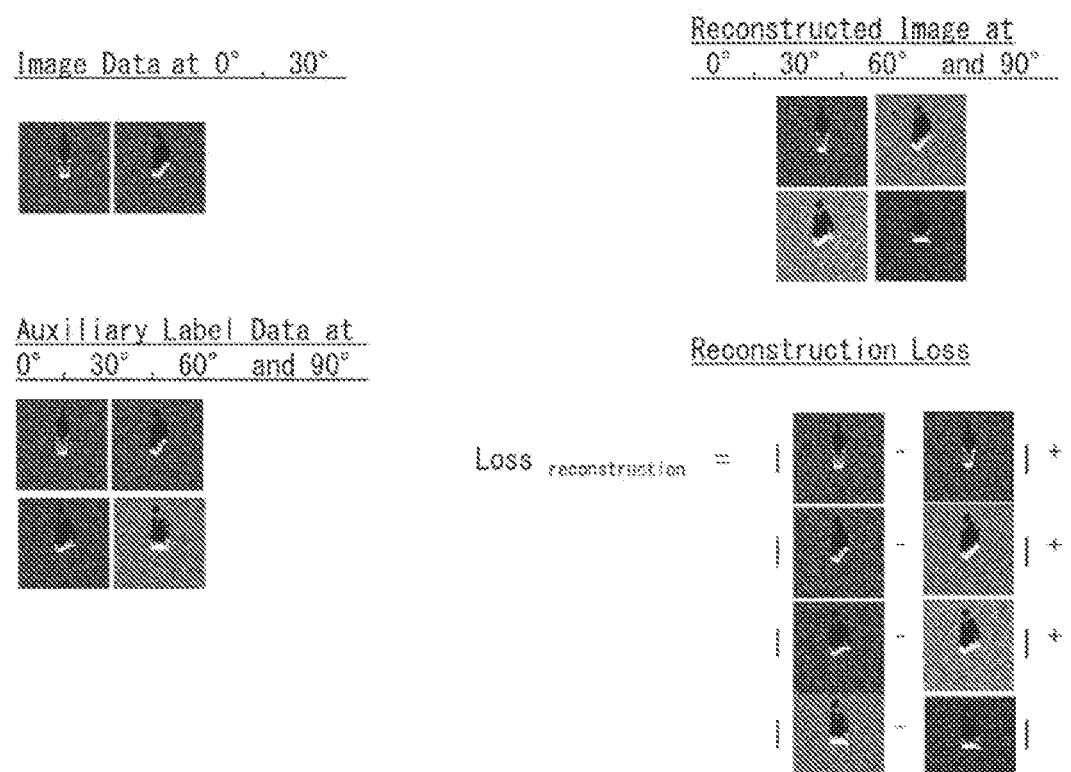
FIG. 17 is a diagram showing examples of data in an example configuration of the fourth example embodiment.

As a specific example, in a case where input source domain image data $I^S$ having angles of 0 degree and 30 degrees as shown on the upper left of FIG. 17 is given, the first auxiliary task solving section 17a may generate, from the source domain feature values $X^S$ and the converted source domain feature values $X'^S$, source domain reconstructed images having angles of 0 degree, 30 degrees, 60 degrees, and 90 degrees as shown on the upper right of FIG. 17.

The first auxiliary loss computation section 18a outputs a source domain reconstruction loss with reference to the source domain reconstructed images. The first auxiliary loss computation section 18a may also refer to the source domain input image data when outputting the source domain reconstruction loss.

More specifically, the first auxiliary loss computation section 18a outputs a source domain reconstruction loss with reference to the source domain reconstructed images and auxiliary label data which is ground truth label data.

As a specific example, suppose that (i) the reconstructed images as shown on the upper right of FIG. 17 and (ii) the auxiliary label data as shown on the lower left of FIG. 17 are given. The first auxiliary loss computation section 18a outputs a source domain reconstruction loss (Loss_reconstruction_S) by computing differences between the source domain reconstructed images and the auxiliary label data schematically shown on the lower right of FIG. 17.

In a similar manner, the second auxiliary task solving section 17b may generate target domain reconstructed image images from the target domain feature values $X^T$ and the converted target domain feature values $X'^T$.

The second auxiliary loss computation section 18b outputs a target domain reconstruction loss (Loss_reconstruction_T) with reference to the target domain reconstructed images. The second auxiliary loss computation section 18b may also refer to the target domain input image data when outputting the target domain reconstruction loss.

The merged loss computation section 145 may compute a merged loss (Loss_merge) with reference to at least one of the source domain classification loss (Loss_classification_S), the target domain classification loss (Loss_classification_T), the grouping loss (Loss_grouping), the conversion loss (Loss_conversion), the source domain reconstruction loss (Loss_reconstruction_S), and the target domain reconstruction loss (Loss_reconstruction_T).

For example, the merged loss computation section 145 may compute a merged loss as follows.

[Math.33]

$$\mathrm{Loss}_{merge} = \alpha \mathrm{Loss}_{classification\ S} + \beta \mathrm{Loss}_{classification\ T} + \\ \gamma \mathrm{Loss}_{grouping} + \delta \mathrm{Loss}_{conversion} + \\ \eta' \mathrm{Loss}_{reconstruction\ S} + \xi' \mathrm{Loss}_{reconstruction\ T}$$

(Eq. 33)

Here, the coefficients $\alpha$, $\beta$, $\gamma$, $\delta$, $\eta'$, and $\xi'$ indicate weight coefficients whose specific values do not limit the fourth example embodiment. Note that in this third exemplary configuration, the model updating section 146 may also update the first auxiliary updating section 17a (reconstruction means) and the second auxiliary updating section 17b (reconstruction means) with reference to the merged loss explained above.

According to the third exemplary configuration, the first auxiliary task solving section 17a and the second auxiliary task solving section 17b may ensure appropriate angle conversions by the first angle conversion section 12a and the second angle conversion section 12b, respectively. This ensures accuracy of the predictions given by the first class prediction section 13a and the second class prediction section 13b.

Fourth Exemplary Configuration

In a fourth exemplary configuration, the first auxiliary task solving section 17a and the second auxiliary task solving section 17b are examples of the one or more angle conversion discrimination means recited in claims. The first auxiliary loss computation section 18a and the second auxiliary loss computation section 18b are examples of the one or more conversion discrimination loss computation means recited in claims.

The first auxiliary task solving section 17a may carry out a first conversion discrimination process to discriminate the source domain feature values $X^S$ from the converted source domain feature values $X'^S$.

The first auxiliary loss computation section 18a may output a source domain conversion discrimination loss with reference to a result of the first conversion discrimination process.

More specifically, the first auxiliary loss computation section 18a may output a source domain conversion discrimination loss with reference to a result of the first conversion discrimination process and conversion label data which is ground truth label data.

As a specific example, the first auxiliary task solving section 17*a* may carry out a first conversion discrimination process to discriminate the source domain feature values $X^S$ from the converted source domain feature values $X'^S$ and may output source domain conversion discrimination prediction values $P'^S$ as a result of the first conversion discrimination process as follows.

[Math.34]

$$P'^S = [\text{real,real,real,real,converted,converted,real,converted}] \quad \text{(Eq. 34)}$$

As a specific example, the source domain auxiliary label data $Y'^S$ may be given correspondingly as follows.

[Math.35]

$$Y'^S = [\text{real,real,real,real,converted,converted,converted,converted}] \quad \text{(Eq. 35)}$$

In a case where the source domain conversion discrimination prediction values $P'^S$ are given by Eq. 34 and the source domain auxiliary label data $Y'^S$ is given by Eq. 35, the first auxiliary loss computation section 18*a* outputs a source domain conversion discrimination loss (Loss_conversion_ discrimination_S) as follows.

[Math.36]

$$\text{Loss}_{conversion\ discrimination\ S} = 1 \quad \text{(Eq.36)}$$

The second auxiliary task solving section 17*b* may carry out a second conversion discrimination process to discriminate the target domain feature values from the converted target domain feature values.

The second auxiliary loss computation section 18*b* may output a target domain conversion discrimination loss (Loss_conversion_discrimination_T) as a result of the second conversion discrimination process.

The merged loss computation section 145 may compute a merged loss (Loss_merge) with reference to at least one of the source domain classification loss (Loss_classification_S), the target domain classification loss (Loss_classification_T), the grouping loss (Loss_grouping), the conversion loss (Loss_conversion), the source domain conversion discrimination loss (Loss_conversion_discrimination_S), and the target domain conversion discrimination loss (Loss_ conversion_discrimination_T).

For example, the merged loss computation section 145 may compute a merged loss as follows.

[Math.37]

$$\begin{aligned}\text{Loss}_{merge} = &\alpha\text{Loss}_{classification\ S} + \beta\text{Loss}_{classification\ T} + \\ &\gamma\text{Loss}_{grouping} + \delta\text{Loss}_{conversion} - \\ &\tau'\text{Loss}_{conversion\ discrimination\ S} - \\ &\tau''\text{Loss}_{conversion\ discrimination\ T} \end{aligned} \quad \text{(Eq. 37)}$$

Here, the coefficients $\alpha$, $\beta$, $\gamma$, $\delta$, $\tau'$ and $\tau''$ indicate weight coefficients whose specific values do not limit the fourth example embodiment. Note that the sign in front of the source domain conversion discrimination loss is minus. This means that the model updating section 146 updates the model parameters for the first feature extraction section 11*a*, the first angle conversion section 12*a*, and the first auxiliary task solving section 17*a* such that the source domain converted features $X'^S$ may cause the conversion discrimination result by the first auxiliary task solving section 17*a* to become less accurate. In other words, the model updating section 146 updates the model parameters for the first feature extraction section 11*a*, the first angle conversion section 12*a*, and the first auxiliary task solving section 17*a* such that the converted features $X'^S$ may confuse the first auxiliary task solving section 17*a*.

Note also that the sign in front of the target domain conversion discrimination loss is minus. This means that the model updating section 146 updates the model parameters for the second feature extraction section 11*b*, the second angle conversion section 12*b*, and the second auxiliary task solving section 17*b* such that the target domain converted features $X'^T$ may cause the conversion discrimination result by the second auxiliary task solving section 17*b* to become less accurate. In other words, the model updating section 146 updates the model parameters for the second feature extraction section 11*b*, the second angle conversion section 12*b*, and the second auxiliary task solving section 17*b* such that the converted features $X'^T$ may confuse the second auxiliary task solving section 17*b*.

(Advantageous Effect)

Without the first auxiliary task solving section 17*a*, the second auxiliary task solving section 17*b*, the first auxiliary loss computation section 18*a*, and the second auxiliary loss computation section 18*b*, the training apparatus may cause the following situation.

The converted target features $X'^T$ may look like neither source domain features $X'^S$ nor target domain features $X'^T$, because the conversion functions of the first angle conversion section 12*a* and the second angle conversion section 12*b* may be mainly learnt from the source domain while being applied to target domain features when the angle conversion sections 12*a* and 12*b* share weights.

The above situation is not desirable, because the situation may cause predictions given by the first class prediction section 13*a* and the second class prediction section 13*b* to become less accurate.

According to the fourth exemplary configuration, the first auxiliary task solving section 17*a* and the second auxiliary task solving section 17*b* may ensure appropriate angle conversions by the first angle conversion section 12*a* and the second angle conversion section 12*b*, respectively. This ensures accuracy of the predictions given by the first class prediction section 13*a* and the second class prediction section 13*b*.

(Training Method by Training Apparatus)

Figure 18:
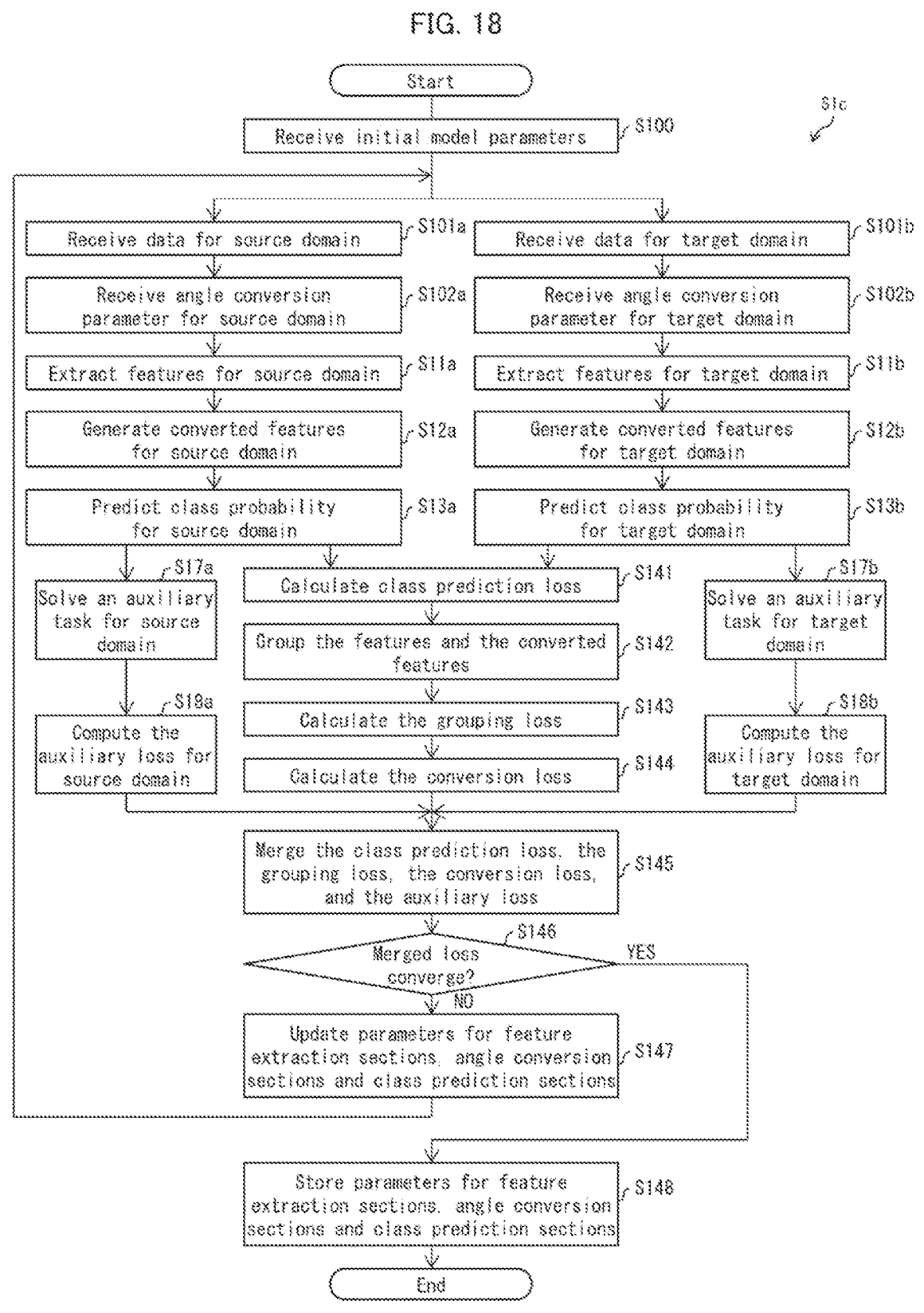

The following description will discuss a training method carried out by the training apparatus 10*c* according to the fourth example embodiment with reference to FIG. 18. FIG. 18 is a flowchart showing a flow of a training method S1*c* carried out by the training apparatus 10*c*.

As shown in FIG. 18, the training method S1c according to the fourth example embodiment further includes a step S17*a*, a step S17*b*, a step S18*a*, and a step S18*b*, in addition to the steps included in the training method S1*a* according to the second example embodiment. In the following descriptions, only differences between the training method S1*c* according to the fourth example embodiment and the training method S1*a* according to the second example embodiment will be described.

(Step S17*a*)

In the step S17*a*, the first auxiliary task solving section 17*a* carries out a source domain auxiliary task. A specific process carried out by the first auxiliary task solving section 17*a* is described above and is therefore not repeatedly described here.

(Step S18*a*)

In the step S18*a*, the first auxiliary loss computation section 18*a* outputs a source domain conversion discrimination loss. A specific process carried out by the first auxiliary loss computation section 18*a* is described above and is therefore not repeatedly described here.

(Step S17*b*)

In the step S17*b*, the second auxiliary task solving section 17*b* carries out a target domain auxiliary task. A specific process carried out by the second auxiliary task solving section 17*b* is described above and is therefore not repeatedly described here.

(Step S18*b*)

In the step S18*b*, the second auxiliary loss computation section 18*b* outputs a target domain conversion discrimination loss. A specific process carried out by the second auxiliary loss computation section 18*b* is described above and is therefore not repeatedly described here.

(Step S145)

In the step S145, the merged loss computation section 145 computes a merged loss (Loss_merge). A specific process carried out by the merged loss computation section 145 is described above and is therefore not repeatedly described here.

Note that the order of the steps in the training method S1*c* does not limit the fourth example embodiment. For example, in the training method S1*c*, the steps (S17*a*, S18*a*) and the steps S141 to S144 can be carried out in any order. Furthermore, the steps (S17*b*, S18*b*) and the steps S141 to S144 can be carried out in any order.

(Advantageous Effect)

According to the fourth example embodiment, the training method S1*c* provides an advantageous effect similar to that provided by the training apparatus 10*c*.

(Configuration of Classification Apparatus)

The following description will discuss a configuration of a classification apparatus according to the fourth example embodiment. The classification apparatus 20*c* according to the fourth example embodiment has a configuration similar to that of the classification apparatus 20*a* illustrated in FIG. 11.

According to the fourth example embodiment, the training apparatus 10*c* achieves accuracy of the predictions given by the first class prediction section 13*a* and the second class prediction section 13*b*.

Therefore, the classification apparatus according to the fourth example embodiment provides an accurate classification process for the target domain by the second class prediction section 13*b*.

Fifth Example Embodiment

The following description will discuss details of a fifth example embodiment of the present invention with reference to the drawings. Note that the same reference numerals are given to elements having the same functions as those described in the foregoing example embodiments, and descriptions of such elements are omitted as appropriate. Moreover, an overview of the fifth example embodiment is the same as the overview of the foregoing example embodiments, and is thus not described here.

(Configuration of Training Apparatus)

Figure 19:
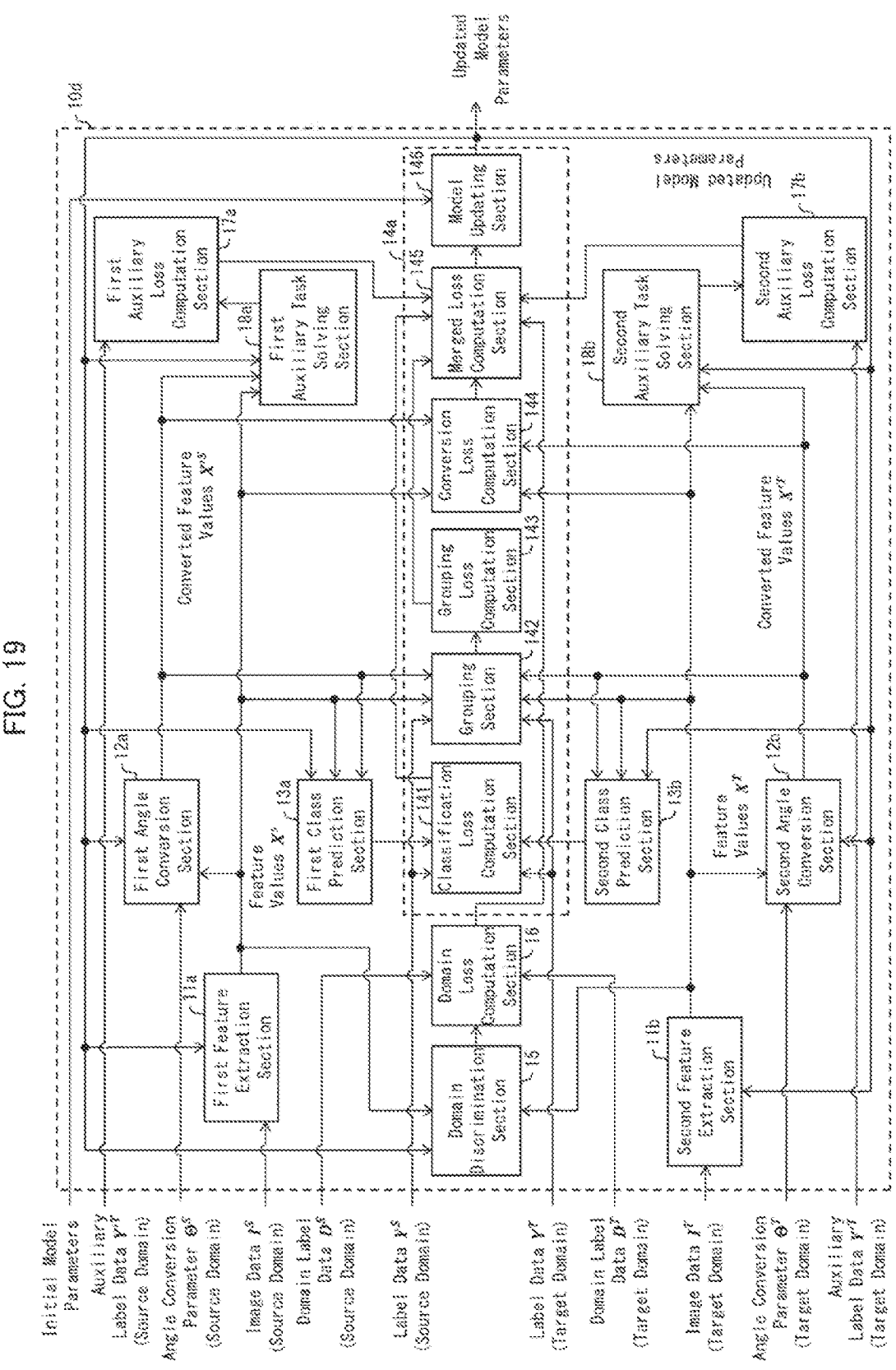
FIG. 19 is a block diagram illustrating a configuration of the training apparatus according to the fifth example embodiment.

The following description will discuss a configuration of a training apparatus 10*d* according to the fifth example embodiment with reference to FIG. 19. FIG. 19 is a block diagram illustrating a configuration of the training apparatus 10*d*. As illustrated in FIG. 19, the training apparatus 10*d* according to the fifth example embodiment includes both the configuration described in the third example embodiment and the configuration described in the fourth example embodiment.

Therefore, the training apparatus 10*d* according to the fifth example embodiment brings about both the effect achieved by the configuration of the third example embodiment and the effect achieved by the configuration of the fourth example embodiment.

(Configuration of Classification Apparatus)

The classification apparatus 20*d* according to the fifth example embodiment has a configuration similar to that of the classification apparatus 20*a* illustrated in FIG. 11. The training apparatus 10*d* according to the fifth example embodiment includes both the configuration described in the third example embodiment and the configuration described in the fourth example embodiment. Furthermore, the classification apparatus 20*d* according to the fifth example embodiment includes the feature extraction section 11*b*, the angle conversion section 12*b*, and the class prediction section 12*b* which have been trained by the training apparatus 10*d*.

Therefore, the classification apparatus 20*d* according to the fifth example embodiment brings about both the effect achieved by the classification apparatus 20*b* according to the third example embodiment and the effect achieved by the classification apparatus 20*c* according to the fourth example embodiment.

Example of Configuration Achieved by Software

One or some of or all of the functions of the training apparatuses 10, 10*a*, 10*b*, 10*c*, and 10*d* and the classification apparatuses 20, 20*a*, 20*b*, 20*c*, and 20*d* can be realized by hardware such as an integrated circuit (IC chip) or can be alternatively realized by software.

Figure 20:
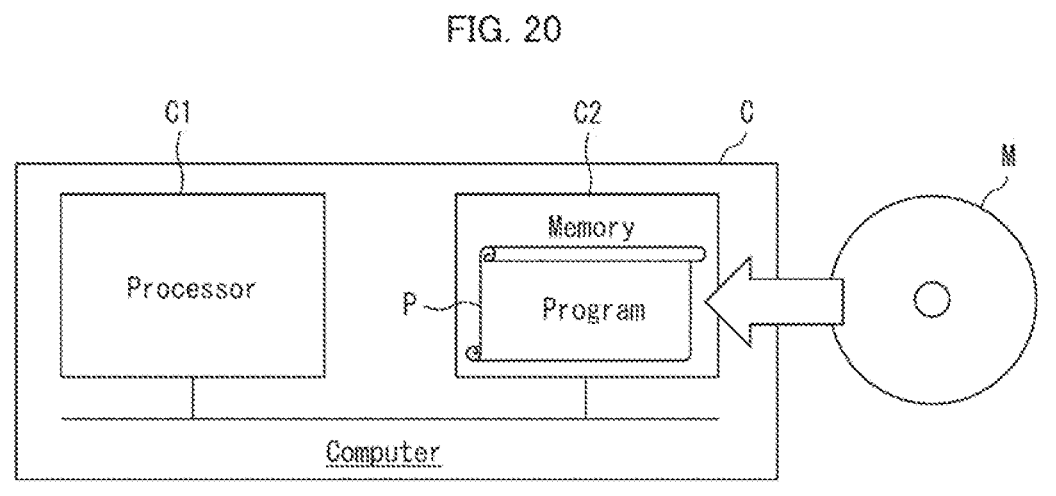

In the latter case, each of the training apparatuses 10, 10*a*, 10*b*, 10*c*, and 10*d* and the classification apparatuses 20, 20*a*, 20*b*, 20*c*, and 20*d* is realized by, for example, a computer that executes instructions of a program that is software realizing the foregoing functions. FIG. 20 illustrates an example of such a computer (hereinafter, referred to as "computer C"). The computer C includes at least one processor C1 and at least one memory C2. The memory C2 stores a program P for causing the computer C to function as any of the training apparatuses 10, 10*a*, 10*b*, 10*c*, and 10*d* and the classification apparatuses 20, 20*a*, 20*b*, 20*c*, and 20*d*. In the computer C, the processor C1 reads the program P from the memory C2 and executes the program P, so that the functions of any of the training apparatuses 10, 10*a*, 10*b*, 10*c*, and 10*d* and the classification apparatuses 20, 20*a*, 20*b*, 20*c*, and 20*d* are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other devices. The computer C can further include an input-output interface for connecting input-output devices such as a keyboard, a mouse, a display, and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by properly combining technical means disclosed in the foregoing example embodiments.

Additional Remark 2

The whole or part of the example embodiments disclosed above can be described as follows. Note, however, that the present invention is not limited to the following example aspects.

Supplementary Notes

Aspects of the present invention can also be expressed as follows:

(Aspect 1)

A training apparatus comprising:

one or more feature extraction means for extracting source domain feature values from input source domain image data and for extracting target domain feature values from input target domain image data;

one or more angle conversion means for generating converted source domain feature values by converting the source domain feature values as if the converted source domain feature values are extracted from source domain image data having different angles from the input source domain image data, and generating converted target domain feature values by converting the target domain feature values as if the converted target domain feature values are extracted from target domain image data having different angles from the input target domain image data; one or more class prediction means for predicting source domain class prediction values from the source domain feature values and the converted source domain feature values, and predicting target domain class prediction values from the target domain feature values and the converted target domain feature values; and updating means for updating at least one of (i) the one or more feature extraction means, (ii) the one or more angle conversion means, and (iii) the one or more class prediction means with reference to a source domain classification loss computed with reference to the source domain class prediction values, a target domain classification loss computed with reference to the target domain class prediction values, and a conversion loss computed with reference to source domain feature values, converted source domain feature values, target domain feature values and converted target domain feature values, and a grouping loss computed with reference to the source domain feature values, the converted source domain feature values, the target domain feature values, and the converted target domain feature values.

According to the above configuration, it is possible to provide an efficient training process in a case where training images having a limited variation of shooting angles are available.

(Aspect 2)

The training apparatus according to Aspect 1, wherein the one or more angle conversion means generate the converted source domain feature values with reference to one or more source domain angle conversion parameters, and generate the converted target domain feature values with reference to one or more target domain angle conversion parameters.

According to the above configuration, it is possible to provide a more efficient training process.

(Aspect 3)

The training apparatus according to Aspect 1 or 2, wherein the updating means comprises grouping means for outputting class groups from the source domain feature values, the converted source domain feature values, the target domain feature values, and the converted target domain feature values, wherein each of the class groups contains the feature values sharing a same class label.

According to the above configuration, it is possible to provide a more efficient training process.

(Aspect 4)

The training apparatus according to Aspect 3, wherein the updating means further comprises grouping loss computation means for computing the grouping loss with reference to the class groups.

According to the above configuration, it is possible to provide a more efficient training process.

(Aspect 5)

The training apparatus according to Aspect 4, wherein the grouping loss computation means computes the grouping loss based on intra class metrics determined with reference to the feature values in a same class, and inter class metrics determined with reference to the feature values in different classes.

According to the above configuration, it is possible to provide a more efficient training process.

(Aspect 6)

The training apparatus according to any one of Aspects 1 to 5, wherein the updating means further comprises one or more classification loss computation means for computing the source domain classification loss with reference to the source domain class prediction values and source domain class label data, and the target domain classification loss with reference to the target domain class prediction values and target domain class label data.

According to the above configuration, it is possible to provide a more efficient training process.

(Aspect 7)

The training apparatus according to any one of Aspects 1 to 5, wherein the updating means further comprises conversion loss computation means for computing a conversion loss with reference to the source domain feature values, the converted source domain feature values, the target domain feature values, and the converted target domain feature values.

According to the above configuration, it is possible to provide a more efficient training process.

(Aspect 8)

The training apparatus according to Aspect 7, wherein the updating means further comprises merged loss computation means for computing a merged loss with reference to the source domain classification loss, the target domain classification loss, the grouping loss, and the conversion loss, wherein the updating means updates at least one of (i) the one or more feature extraction means, (ii) the one or more angle conversion means, and (iii) the one or more class prediction means with reference to the merged loss.

According to the above configuration, it is possible to provide a more efficient training process.

(Aspect 9)

The training apparatus according to any one of claims 1 to 8, further comprising:

one or more domain discrimination means for carrying out a discrimination process to discriminate the target domain from the source domain; and one or more domain loss computation means for outputting a domain discrimination loss as a result of the discrimination process, wherein the updating means further refers to the domain discrimination loss, and the updating means further updates the domain discrimination means.

According to the above configuration, it is possible to provide a more efficient training process.

(Aspect 10)

The training apparatus according to any one of claims 1 to 9, further comprising:

one or more angle prediction means for predicting source domain angle prediction values from the source domain feature values and the converted source domain feature values, and predicting target domain angle prediction values from the target domain feature values and the converted target domain feature values; and one or more angle prediction loss computation means for outputting a source domain angle prediction loss with reference to the source domain angle prediction values and source domain angle label data, and outputting a target domain angle prediction loss with reference to the target domain angle prediction values and target domain angle label data, wherein the updating means further refers to the source domain angle prediction loss and the target domain angle prediction loss, and the updating means further updates the angle prediction means.

According to the above configuration, it is possible to provide a more efficient training process.

(Aspect 11)

The training apparatus according to any one of claims 1 to 9, further comprising:

one or more image reconstruction means for generating source domain reconstructed images from the source domain feature values and the converted source domain feature values, and generating target domain reconstructed images from the target domain feature values and the converted target domain feature values; and one or more reconstruction loss computation means for outputting a source domain reconstruction loss with reference to the source domain reconstructed images and the source domain input image data, and outputting a target domain reconstruction loss with reference to the target domain reconstructed images and the target domain input image data, wherein the updating means further refers to the source domain reconstruction loss and the target domain reconstruction loss, and the updating means further updates the image reconstruction means.

According to the above configuration, it is possible to provide a more efficient training process.

(Aspect 12)

The training apparatus according to any one of claims 1 to 9, further comprising:

one or more conversion discrimination means for carrying out a conversion discrimination process to discriminate the source domain feature values from the converted source domain feature values, and discriminate the target domain feature values from the converted targets domain feature values; and one or more conversion discrimination loss computation means for outputting a source domain conversion discrimination loss and a target domain conversion discrimination loss with reference to a result of the conversion discrimination process, wherein the updating means further refers to at least one of the source domain conversion discrimination loss and the target domain conversion discrimination loss, and the updating means further updates the conversion discrimination means.

According to the above configuration, it is possible to provide a more efficient training process.

(Aspect 13)

A classification apparatus comprising:

feature extraction means for extracting feature values from input image data; and class prediction means for predicting class prediction values from the feature values and the converted feature values, wherein at least one of the feature extraction means and the class prediction means has been trained with reference to converted feature values obtained by converting the feature values as if the converted feature values are extracted from image data having different angles from the input image data.

According to the above configuration, it is possible to provide a preferable classification process even in a case where training images having a limited variation of shooting angles are available.

(Aspect 14)

A training method comprising:

extracting, by one or more feature extraction means, source domain feature values from input source domain image data, and target domain feature values from input target domain image data;

generating, by one or more angle conversion means, converted source domain feature values by converting the source domain feature values as if the converted source domain feature values are extracted from source domain image data having different angles from the input source domain image data, and converted target domain feature values by converting the target domain feature values as if the converted target domain feature values are extracted from target domain image data having different angles from the input target domain image data;

predicting, by one or more class prediction means, source domain class prediction values from the source domain feature values and the converted source domain feature values, and target domain class prediction values from the target domain feature values, and the converted target domain feature values; and updating at least one of (i) the one or more feature extraction means, (ii) the one or more angle conversion means, and (iii) the one or more class prediction means with reference to a source domain classification loss computed with reference to the source domain class prediction values, a target domain classification loss computed with reference to the target domain class prediction values, a conversion loss computed with reference to source domain feature values, converted source domain feature values, target domain feature values and converted target domain feature values, and a grouping loss computed with reference to the source domain feature values, the converted source domain feature values, the target domain feature values, and the converted target domain feature values.

According to the above method, it is possible to provide an efficient training process in a case where training images having a limited variation of shooting angles are available.

(Aspect 15)

A classification method comprising:

extracting, by feature extraction means, feature values from input image data; and predicting, by class prediction means, class prediction values from the feature values and the converted feature values, wherein at least one of the feature extraction means and the class prediction means has been trained with reference to converted feature values obtained by converting the feature values as if the converted feature values are extracted from image data having different angles from the input image data.

According to the above method, it is possible to provide a preferable classification process even in a case where training images having a limited variation of shooting angles are available.

(Aspect 16)

A program for causing a computer to function as a training apparatus according to Aspect 1, the program causing the computer to function as each of the feature extraction means, the class prediction means, the conversion means, and the updating means.

(Aspect 17)

A program for causing a computer to function as a classification apparatus according to Aspect 16, the program causing the computer to function as each of the feature extraction means, the conversion means, and the class prediction means.

(Aspect 18)

A training apparatus comprising at least one processor, the processor extracting, by one or more feature extraction means, source domain feature values from input source domain image data, and target domain feature values from input target domain image data;

generating, by one or more angle conversion means, converted source domain feature values by converting the source domain feature values as if the converted source domain feature values are extracted from source domain image data having different angles from the input source domain image data, and converted target domain feature values by converting the target domain feature values as if the converted target domain feature values are extracted from target domain image data having different angles from the input target domain image data;

predicting, by one or more class prediction means, source domain class prediction values from the source domain feature values and the converted source domain feature values, and target domain class prediction values from the target domain feature values, and the converted target domain feature values; and updating at least one of (i) the one or more feature extraction means, (ii) the one or more angle conversion means, and (iii) the one or more class prediction means with reference to a source domain classification loss computed with reference to the source domain class prediction values, a target domain classification loss computed with reference to the target domain class prediction values, a conversion loss computed with reference to source domain feature values, converted source domain feature values, target domain feature values and converted target domain feature values, and a grouping loss computed with reference to the source domain feature values, the converted source domain feature values, the target domain feature values, and the converted target domain feature values.

Note that the training apparatus can further include a memory. In the memory, a program for causing the processor to execute the processes can be stored. Alternatively, the program can be stored in a computer-readable non-transitory tangible storage medium.

(Aspect 19)

A classification apparatus comprising at least one processor, the processor extracting, by feature extraction means, feature values from input image data; and predicting, by class prediction means, class prediction values from the feature values and the converted feature values, wherein at least one of the feature extraction means and the class prediction means has been trained with reference to converted feature values obtained by converting the feature values as if the converted feature values are extracted from image data having different angles from the input image data.

Note that the classification apparatus can further include a memory. In the memory, a program for causing the processor to execute the processes can be stored. Alternatively, the program can be stored in a computer-readable non-transitory tangible storage medium.

REFERENCE SIGNS LIST 10, 10*a*, 10*b*, 10*c*, 10*d* Training Apparatus
20, 20*a*, 20*b*, 20*c*, 20*d* Classification Apparatus
11, 11*a*, 11*b* Feature Extraction Section 12, 12*a*, 12*b* Angle Conversion Section
13, 13*a*, 13*b* Class Prediction Section
14, 14*a* Updating Section
141 Classification Loss Computation Section
142 Grouping Section
143 Grouping Loss Computation Section
144 Conversion Loss Computation Section
145 Merged Loss Computation Section
146 Model Updating Section
15 Domain Discrimination Section
16 Domain Loss Computation Section
17*a*, 17*b* Auxiliary Task Solving Section
18*a*, 18*b* Auxiliary Loss Computation Section

What is claimed is:

1. A training apparatus comprising at least one processor, the at least one processor carrying out:

an extraction process for extracting, by one or more feature extractors, source domain feature values from input source domain image data and for extracting target domain feature values from input target domain image data;

an angle conversion process for generating, by one or more angle converters:

converted source domain feature values by converting the source domain feature values as if the converted source domain feature values are extracted from source domain image data having different angles from the input source domain image data, and converted target domain feature values by converting the target domain feature values as if the converted target domain feature values are extracted from target domain image data having different angles from the input target domain image data;

a class prediction process for predicting, by one or more class predictors:

source domain class prediction values from the source domain feature values and the converted source domain feature values, and target domain class prediction values from the target domain feature values and the converted target domain feature values; and an updating process for updating at least one of (i) the one or more feature extractors, (ii) the one or more angle converters, and (iii) the one or more class predictors with reference to:

a source domain classification loss computed with reference to the source domain class prediction values, a target domain classification loss computed with reference to the target domain class prediction values, a conversion loss computed with reference to the source domain feature values, the converted source domain feature values, the target domain feature values and the converted target domain feature values, and a grouping loss computed with reference to the source domain feature values, the converted source domain feature values, the target domain feature values, and the converted target domain feature values.

2. The training apparatus according to claim 1, wherein the angle conversion process includes:

generating the converted source domain feature values with reference to one or more source domain angle conversion parameters, and generating the converted target domain feature values with reference to one or more target domain angle conversion parameters.

3. The training apparatus according to claim 1, wherein the updating process comprises:

a grouping process for outputting class groups from the source domain feature values, the converted source domain feature values, the target domain feature values, and the converted target domain feature values, wherein each of the class groups contains feature values sharing a same class label.

4. The training apparatus according to claim 3, wherein the updating process further comprises:

a grouping loss computation process for computing the grouping loss with reference to the class groups.

5. The training apparatus according to claim 4, wherein the grouping loss computation process computes the grouping loss based on;

intra class metrics determined with reference to the feature values in a same class, and inter class metrics determined with reference to the feature values in different classes.

6. The training apparatus according to claim 1, wherein the updating process further comprises:

one or more classification loss computation processes for computing:

the source domain classification loss with reference to the source domain class prediction values and source domain class label data, and the target domain classification loss with reference to the target domain class prediction values and target domain class label data.

7. The training apparatus according to claim 1, wherein the updating process further comprises:

a conversion loss computation process for computing the conversion loss with reference to the source domain feature values, the converted source domain feature values, the target domain feature values, and the converted target domain feature values.

8. The training apparatus according to claim 7, wherein the updating process further comprises:

a merged loss computation process for computing a merged loss with reference to the source domain classification loss, the target domain classification loss, the grouping loss, and the conversion loss, wherein the updating process updates at least one of (i) the one or more feature extractors, (ii) the one or more angle converters, and (iii) the one or more class predictors with reference to the merged loss.

9. The training apparatus according to claim 1, the at least one processor further carrying out:

a domain discrimination process for carrying out, by one or more domain discriminators, a discrimination process to discriminate the target domain from the source domain; and one or more domain loss computation processes for outputting a domain discrimination loss as a result of the discrimination process, wherein the updating process further refers to the domain discrimination loss, and the updating process further updates the one or more domain discriminators.

10. The training apparatus according to claim 1, the at least one processor further carrying out:

an angle prediction process for predicting, by one or more angle predictors:

source domain angle prediction values from the source domain feature values and the converted source domain feature values, and target domain angle prediction values from the target domain feature values and the converted target domain feature values; and one or more angle prediction loss computation processes for:

outputting a source domain angle prediction loss with reference to the source domain angle prediction values and source domain angle label data, and outputting a target domain angle prediction loss with reference to the target domain angle prediction values and target domain angle label data, wherein the updating process further refers to the source domain angle prediction loss and the target domain angle prediction loss, and the updating process further updates the one or more angle predictors.

11. The training apparatus according to claim 1, the at least one processor further carrying out:

an image reconstruction process for generating, by one or more image reconstructors:

source domain reconstructed images from the source domain feature values and the converted source domain feature values, and target domain reconstructed images from the target domain feature values and the converted target domain feature values; and one or more reconstruction loss computation processes for:

outputting a source domain reconstruction loss with reference to the source domain reconstructed images and the input source domain image data, and outputting a target domain reconstruction loss with reference to the target domain reconstructed images and the input target domain image data, wherein the updating process further refers to the source domain reconstruction loss and the target domain reconstruction loss, and the updating process further updates the one or more image reconstructors.

12. The training apparatus according to claim 1, the at least one processor further carrying out:

a conversion discrimination process for carrying out, by one or more conversion discriminators, a discrimination process to:

discriminate the source domain feature values from the converted source domain feature values, and discriminate the target domain feature values from the converted target domain feature values; and one or more conversion discrimination loss computation processes for outputting a source domain conversion discrimination loss and a target domain conversion discrimination loss with reference to a result of the conversion discrimination process, wherein the updating process further refers to at least one of the source domain conversion discrimination loss and the target domain conversion discrimination loss, and the updating process further updates the one or more conversion discriminators.

13. A classification apparatus comprising at least one processor, the at least one processor carrying out:

a feature extraction process for extracting, by feature extractors, feature values from input image data; and a class prediction process for predicting, by class predictors, class prediction values from the feature values, wherein at least one of the feature extractors and the class predictors has been trained with reference to:

an extraction process for extracting, by one or more feature extractors, source domain feature values from input source domain image data and for extracting target domain feature values from input target domain image data an angle conversion process for generating, by one or more angle converters:

converted source domain feature values by converting the source domain feature values as if the converted source domain feature values are extracted from source domain image data having different angles from the input source domain image data, and converted target domain feature values by converting the target domain feature values as if the converted target domain feature values are extracted from target domain image data having different angles from the input target domain image data;

a second class prediction process for predicting, by one or more class predictors:

source domain class prediction values from the source domain feature values and the converted source domain feature values, and target domain class prediction values from the target domain feature values and the converted target domain feature values; and an updating process for updating at least one of (i) the one or more feature extractors, (ii) the one or more angle converters, and (iii) the one or more class predictors with reference to:

a source domain classification loss computed with reference to the source domain class prediction values, a target domain classification loss computed with reference to the target domain class prediction values, a conversion loss computed with reference to the source domain feature values, the converted source domain feature values, the target domain feature values and the converted target domain feature values, and a grouping loss computed with reference to the source domain feature values, the converted source domain feature values, the target domain feature values, and the converted target domain feature values.

14. A training method comprising:

extracting, by one or more feature extractors:

source domain feature values from input source domain image data, and target domain feature values from input target domain image data;

generating, by one or more angle converters, converted source domain feature values by converting the source domain feature values as if the converted source domain feature values are extracted from source domain image data having different angles from the input source domain image data, and converted target domain feature values by converting the target domain feature values as if the converted target domain feature values are extracted from target domain image data having different angles from the input target domain image data;

predicting, by one or more class predictors:

source domain class prediction values from the source domain feature values and the converted source domain feature values, and target domain class prediction values from the target domain feature values, and the converted target domain feature values; and updating at least one of (i) the one or more feature extractors, (ii) the one or more angle converters, and (iii) the one or more class predictors with reference to a source domain classification loss computed with reference to the source domain class prediction values, a target domain classification loss computed with reference to the target domain class prediction values, a conversion loss computed with reference to the source domain feature values, the converted source domain feature values, the target domain feature values and the converted target domain feature values, and a grouping loss computed with reference to the source domain feature values, the converted source domain feature values, the target domain feature values, and the converted target domain feature values.

15. A non-transitory storage medium storing therein a program for causing a computer to function as a training apparatus according to claim 1, the program causing the computer to carrying out each of the extraction process, the class prediction process, the angle conversion process, and the updating process.

16. A non-transitory storage medium storing therein a program for causing a computer to function as a classification apparatus according to claim 13, the program causing the computer to carry out each of the feature extraction process, and the class prediction process.

\*  \*  \*  \*  \*